US009927870B2

United States Patent
Li

(10) Patent No.: US 9,927,870 B2
(45) Date of Patent: Mar. 27, 2018

(54) VIRTUAL REALITY SYSTEM WITH CONTROL COMMAND GESTURES

(71) Applicant: Ariadne's Thread (USA), Inc., Solana Beach, CA (US)

(72) Inventor: Adam Li, Solana Beach, CA (US)

(73) Assignee: Ariadne's Thread (USA), Inc., Solana Beach, CA (US)

( * ) Notice: Subject to any disclaimer, the term of this patent is extended or adjusted under 35 U.S.C. 154(b) by 0 days.

(21) Appl. No.: 15/452,638

(22) Filed: Mar. 7, 2017

(65) Prior Publication Data

US 2017/0185144 A1    Jun. 29, 2017

Related U.S. Application Data

(63) Continuation of application No. 14/852,304, filed on Oct. 26, 2015, now Pat. No. 9,588,593, which is a
(Continued)

(51) Int. Cl.

| | |
|---|---|
| *G06F 3/01* | (2006.01) |
| *G02B 27/01* | (2006.01) |
| *G06F 3/0346* | (2013.01) |
| *G06K 9/00* | (2006.01) |
| *G06K 9/66* | (2006.01) |
| *G06T 3/00* | (2006.01) |
| *G06T 15/00* | (2011.01) |

(Continued)

(52) U.S. Cl.
CPC ............ *G06F 3/012* (2013.01); *G02B 27/017* (2013.01); *G06F 3/017* (2013.01); *G06F 3/0346* (2013.01); *G06K 9/00362* (2013.01); *G06K 9/66* (2013.01); *G06T 3/0093* (2013.01); *G06T 15/00* (2013.01); *G06T 17/00* (2013.01); *G06T 19/003* (2013.01)

(58) Field of Classification Search
CPC .......... G06F 3/017; G06F 3/011; G06F 3/012; G06T 19/006; G06T 3/0093
See application file for complete search history.

(56) References Cited

U.S. PATENT DOCUMENTS

| | | | |
|---|---|---|---|
| 5,841,439 A | 11/1998 | Pose et al. | |
| 6,445,815 B1 | 9/2002 | Sato | |

(Continued)

OTHER PUBLICATIONS

International Search Report and Written Opinion of International Application No. PCT/US16/38564, dated Aug. 5, 2016, 9 pages.
(Continued)

*Primary Examiner* — Haixia Du
(74) *Attorney, Agent, or Firm* — ARC IP Law, PC; Joseph J. Mayo

(57) ABSTRACT

A virtual reality system that uses gestures to obtain commands from a user. Embodiments may use sensors mounted on a virtual reality headset to detect head movements, and may recognize selected head motions as gestures associated with commands. Commands associated with gestures may modify the user's virtual reality experience, for example by selecting or modifying a virtual world or by altering the user's viewpoint within the virtual world. Embodiments may define specific gestures to place the system into command mode or user input mode, for example to temporarily disable normal head tracking within the virtual environment. Embodiments may also recognize gestures of other body parts, such as wrist movements measured by a smart watch.

16 Claims, 25 Drawing Sheets

Related U.S. Application Data continuation-in-part of application No. 14/788,633, filed on Jun. 30, 2015, now Pat. No. 9,240,069.

(51) Int. Cl.
  *G06T 17/00* (2006.01)
  *G06T 19/00* (2011.01)

(56) References Cited

U.S. PATENT DOCUMENTS

| | | |
|---|---|---|
| 7,469,166 B2 | 12/2008 | Dariush |
| 7,860,676 B2 | 12/2010 | Sheng et al. |
| 8,113,991 B2 | 2/2012 | Kutliroff |
| 8,629,836 B2 | 1/2014 | Liberty |
| 8,866,742 B2 | 10/2014 | Banning |
| 9,063,330 B2 | 6/2015 | LaValle et al. |
| 9,164,588 B1 | 10/2015 | Johnson et al. |
| 9,229,540 B2 | 1/2016 | Mandella et al. |
| 9,240,069 B1 | 1/2016 | Li |
| 9,459,276 B2 | 10/2016 | Joseph |
| 2007/0183649 A1 | 8/2007 | Kiefer et al. |
| 2008/0143729 A1 | 6/2008 | Wyatt et al. |
| 2010/0111370 A1 | 5/2010 | Black et al. |
| 2010/0232727 A1 | 9/2010 | Engedal |
| 2011/0018811 A1 | 1/2011 | Miernik |
| 2011/0018903 A1 | 1/2011 | Lapstun et al. |
| 2011/0157028 A1 | 6/2011 | Stallings et al. |
| 2011/0302293 A1 | 12/2011 | Buban |
| 2012/0188179 A1 | 7/2012 | Karlsson |
| 2012/0235902 A1 | 9/2012 | Eisenhardt et al. |
| 2012/0256840 A1 | 10/2012 | Razzaghi |
| 2013/0018679 A1 | 1/2013 | Qian |
| 2013/0235696 A1 | 9/2013 | Larsen et al. |
| 2013/0238295 A1 | 9/2013 | Hyung et al. |
| 2013/0241947 A1 | 9/2013 | Hirota et al. |
| 2014/0049983 A1 | 2/2014 | Nichol et al. |
| 2014/0125471 A1 | 5/2014 | Organ et al. |
| 2014/0146394 A1 | 5/2014 | Tout et al. |
| 2014/0201690 A1 | 7/2014 | Holz |
| 2015/0029218 A1 | 1/2015 | Williams et al. |
| 2015/0049004 A1 | 2/2015 | Deering et al. |
| 2015/0097858 A1 | 4/2015 | Miki et al. |
| 2015/0153575 A1 | 6/2015 | Komatsu et al. |
| 2015/0219899 A1 | 8/2015 | Mack et al. |
| 2015/0287230 A1 | 10/2015 | Cerny |
| 2015/0302653 A1 | 10/2015 | Algreatly |
| 2015/0323988 A1 | 11/2015 | Kuehne |
| 2016/0025971 A1 | 1/2016 | Crow et al. |
| 2016/0070439 A1 | 3/2016 | Bostick et al. |
| 2016/0085310 A1 | 3/2016 | Shotton et al. |
| 2016/0210780 A1* | 7/2016 | Paulovich ............... G06T 7/73 |
| 2017/0018121 A1 | 1/2017 | Lawson et al. |

OTHER PUBLICATIONS d3, Realtime 3D Simulation, posted on https://d3technologies.com/features/3d_simulation, dated Dec. 10, 2013, 3 pages.

Benton, Alex, "Oculus Rift in Action", Aug. 9, 2013, Obtained from http://rifty-business.blogspot.com/2013/08/understanding-oculus-rift-distortion.html.

Benton, Alex, "Oculus Rift in Action", Aug. 18, 2014, Obtained from http://rifty-business.blogspot.com/2014/08/using-timewarp-on-oculus-rift.html.

International Search Report received in PCT/US2017/026363, dated Jul. 10, 2017, 9 pages.

International Search Report received in PCT/US2017/053929, dated Jan. 4, 2017, 10 pages.

LaValle, Steve, "The Latent Power of Prediction", blog post retrieved from www.developer.oculus.com/blog/the-latent-power-of-prediction/, dated Jul. 12, 2013.

* cited by examiner

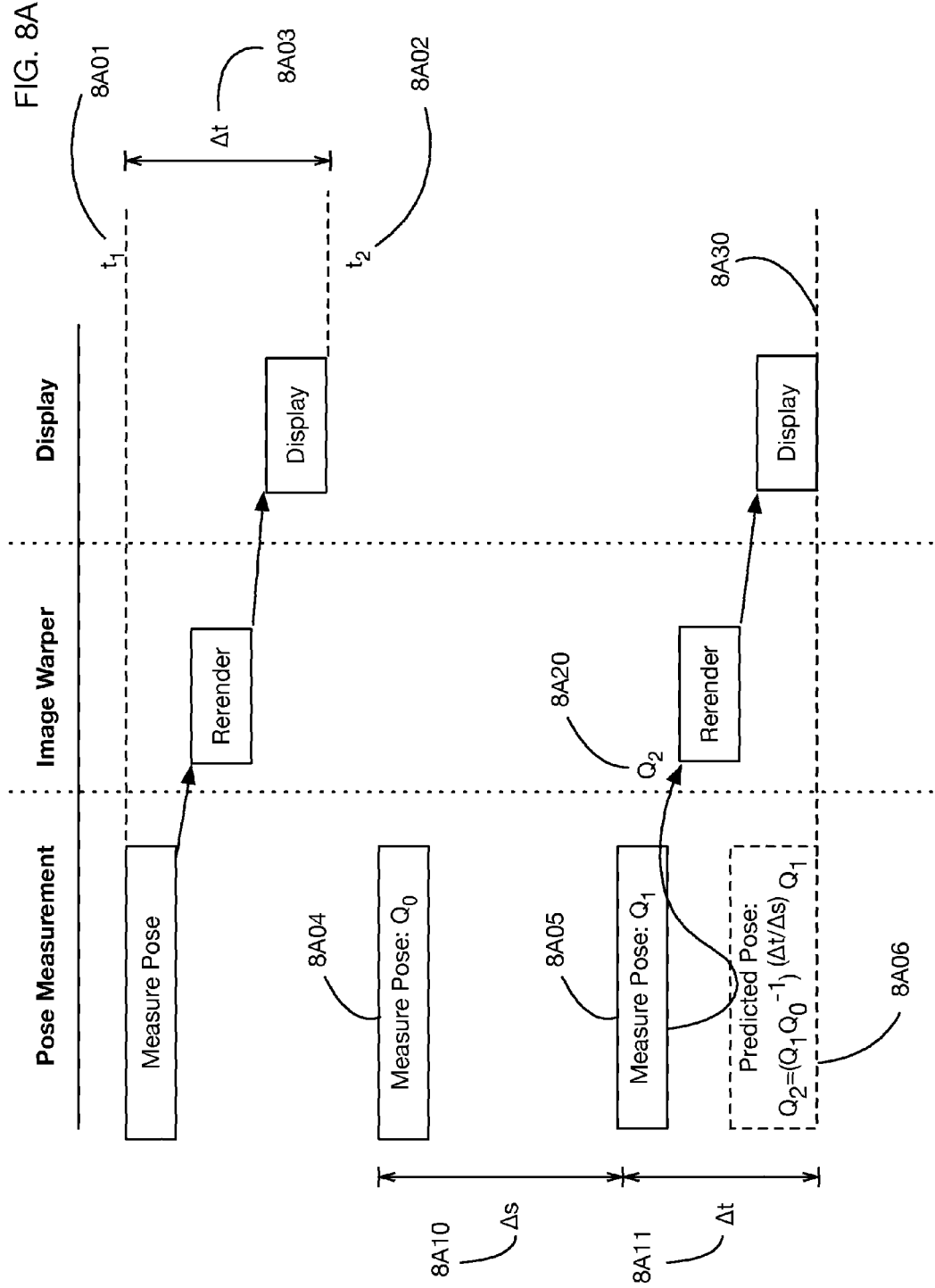

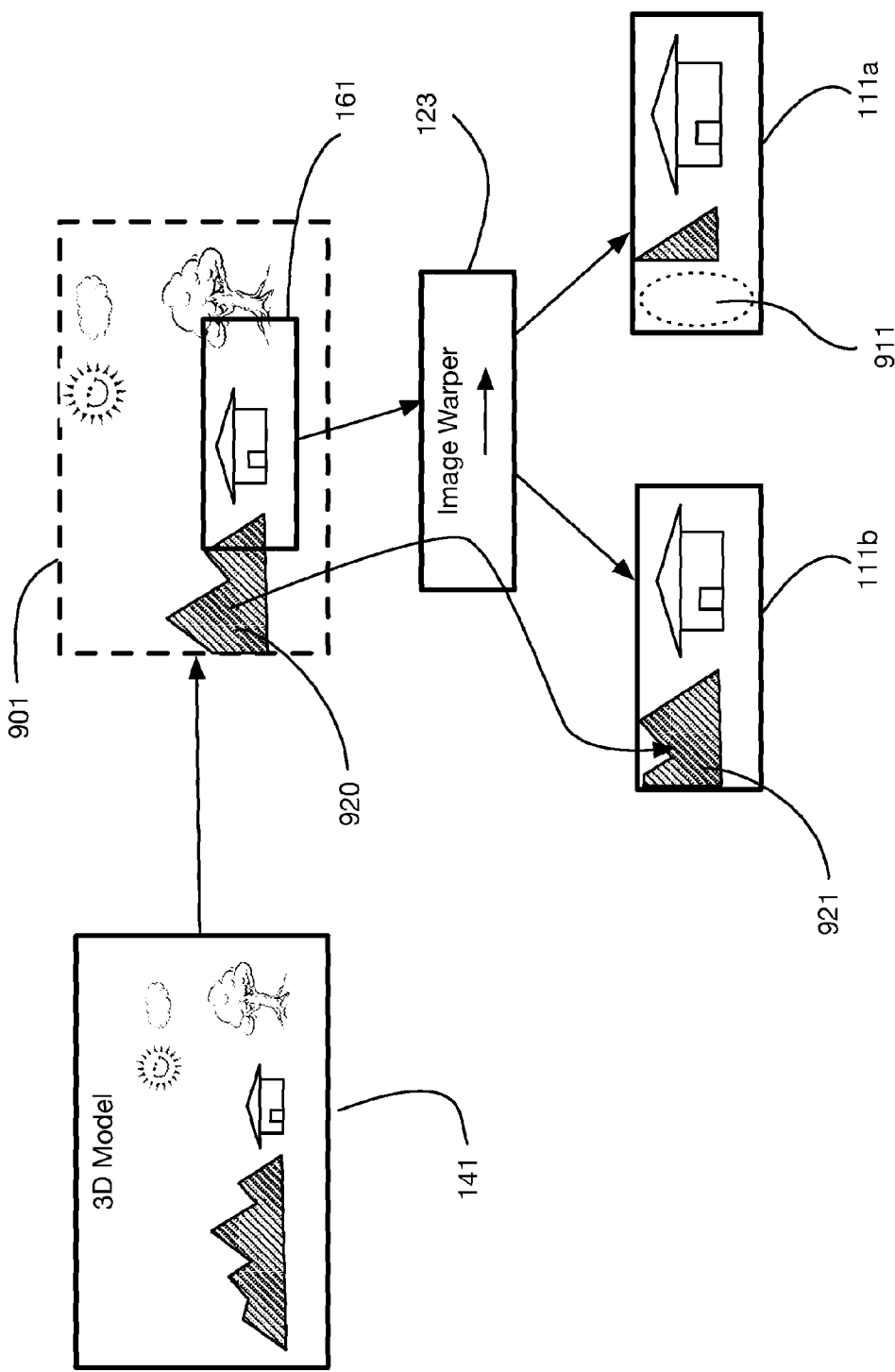

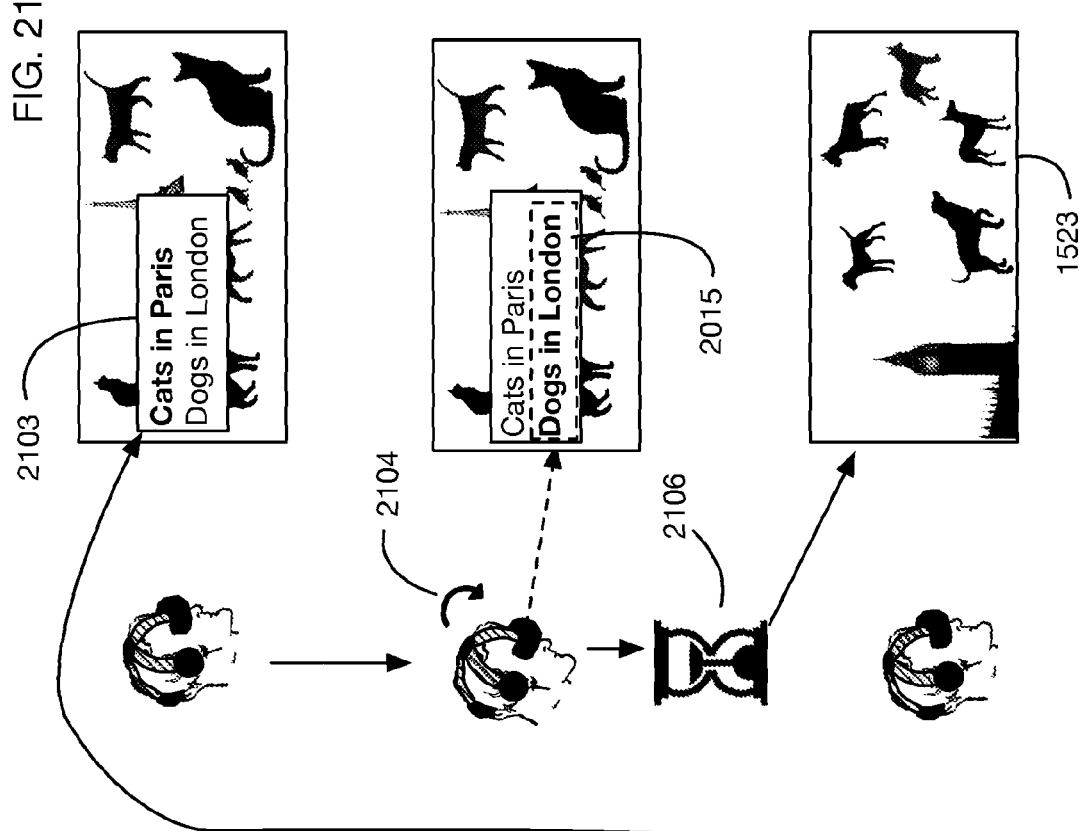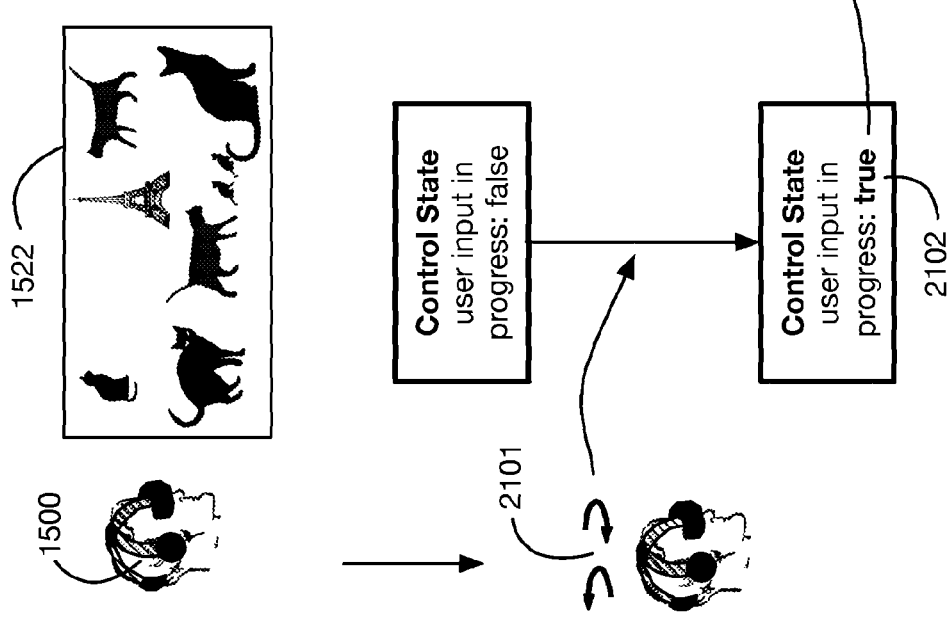
FIG. 21

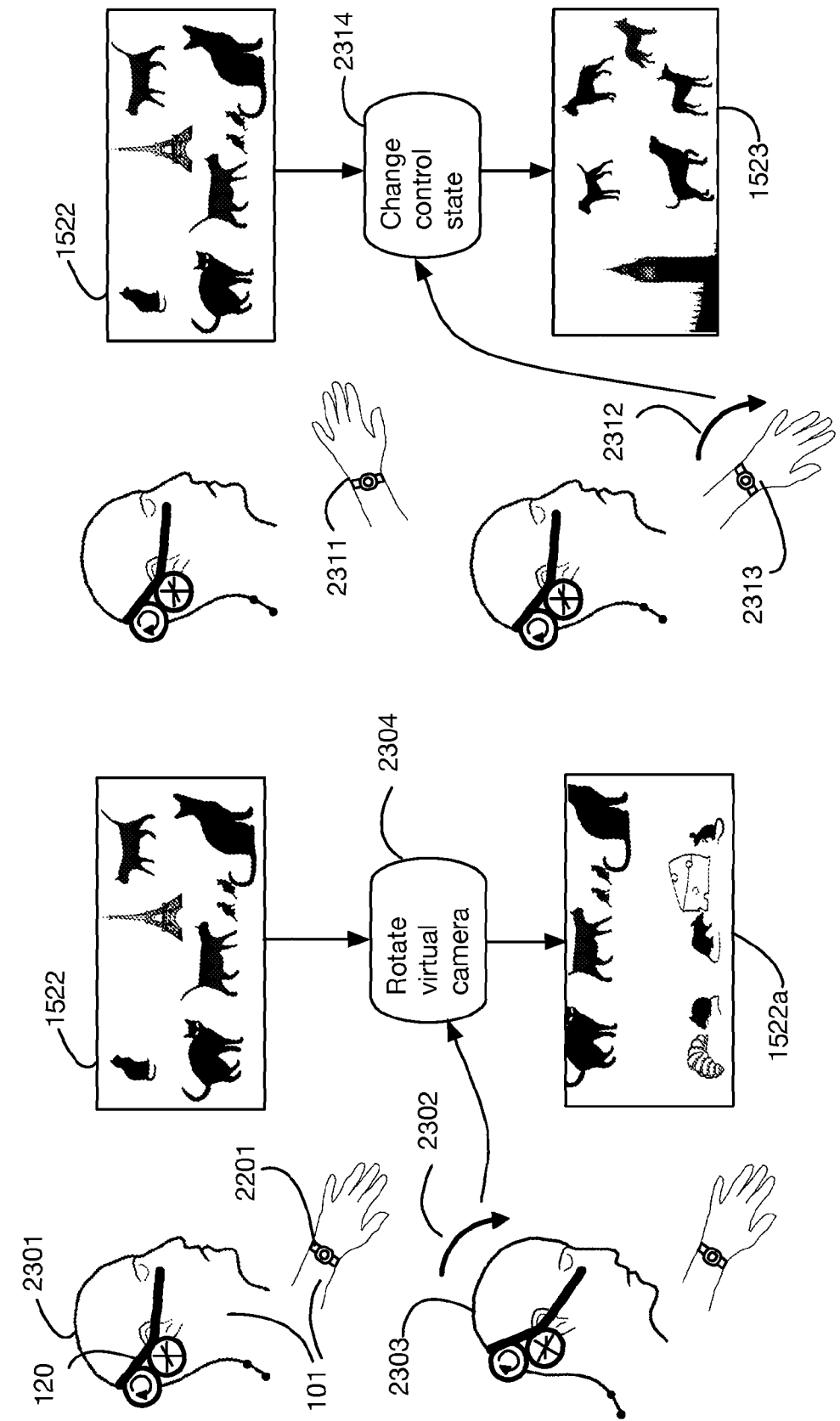

VIRTUAL REALITY SYSTEM WITH CONTROL COMMAND GESTURES

This application is a continuation of U.S. Utility patent application Ser. No. 14/852,304, issued as U.S. Pat. No. 9,588,593, filed on 26 Oct. 2015, which is a continuation in part of U.S. Utility patent application Ser. No. 14/788,633, issued as U.S. Pat. No. 9,240,069, filed 30 Jun. 2015, the specifications of which are hereby incorporated herein by reference.

BACKGROUND OF THE INVENTION

Field of the Invention

One or more embodiments of the invention are related to the field of virtual reality systems. More particularly, but not by way of limitation, one or more embodiments of the invention enable a virtual reality system that recognizes selected gestures of a user as control commands to modify the virtual reality experience.

Description of the Related Art

Virtual reality systems are known in the art. Such systems generate a virtual world for a user that responds to the user's movements. Examples include various types of virtual reality headsets and goggles worn by a user, as well as specialized rooms with multiple displays. Virtual reality systems typically include sensors that track a user's head, eyes, or other body parts, and that modify the virtual world according to the user's movements. The virtual world consists of a three-dimensional model, computer-generated or captured from real-world scenes. Images of the three-dimensional model are generated based on the user's position and orientation. Generation of these images requires rendering of the three-dimensional model onto one or more two-dimensional displays. Rendering techniques are known in the art and are often used for example in 3D graphics systems or computer-based games, as well as in virtual reality systems.

A major challenge for existing virtual reality systems is combining realistic images with low-latency rendering, so that user's virtual reality experience matches the rapid feedback to movement observed in real environments. Existing systems often have long latency to measure changes in the user's position and orientation, and to rerender the virtual world based on these changes. 3D rendering is a complex and processor intensive operation that can take potentially hundreds of milliseconds. The result is that users perceive noticeable lag between their movements and the rendering of updated virtual environments on their displays. Three technology trends are compounding this challenge: (1) The complexity of 3D models is growing as more 3D data is captured and generated. (2) Resolution of virtual reality displays is increasing, requiring more computational power to render images. (3) Users are relying increasingly on mobile devices with limited processor capacity. As a result of these trends, high latency in rendering virtual reality displays has become a major factor limiting adoption and applications of virtual reality technology. There are no known systems that provide sufficiently low-latency rendering and display to generate highly responsive virtual reality environments given these technology constraints.

For at least the limitations described above there is a need for a low-latency virtual reality display system.

An additional challenge for virtual reality systems is obtaining input from the user of the system. Because the user may for example wear goggles or a headset that covers the user's eyes, he or she may not be able to see a keyboard, mouse, touchpad, or other user input device. Some providers of virtual reality systems have attempted to create specialized user input devices that a user can operate without seeing the device, for example using touch for feedback. While functional, these devices are often complex and non-intuitive. There are no known systems that provide a simple method of using the virtual reality system itself to obtain user input. Since the virtual reality system already tracks a user's movements in order to render the virtual world, use of these movements for the additional purpose of user input is a promising approach. However, there are no known systems that provide user input for a virtual reality system without additional devices or physical controls.

For at least the limitations described above there is a need for a virtual reality display system with control command gestures, which analyzes the user's motion to recognize gestures associated with specific commands.

BRIEF SUMMARY OF THE INVENTION

One or more embodiments described in the specification are related to a virtual reality system with control command gestures.

Embodiments of the system use efficient approximations to rerender virtual reality displays quickly in response to changes in the position or orientation of a user. This efficient and rapid rerendering reduces latency and improves the user's virtual reality experience.

One or more embodiments of the system include one or more displays viewable by a user. For example, these displays may be embedded in virtual reality goggles or glasses. One or more embodiments also include one or more sensors that measure aspects of the user's position, orientation, or both. Aspects of the user's orientation and position are referred to as the user's "pose" in this specification. Pose sensors may for example measure movements of the user's head, or of the user's eyes, or more generally of any body part or parts of the user. Embodiments of the system include a pose analyzer that receives sensor data and determines the user's pose from this data. The pose information is passed to a scene renderer, which generates the 3D virtual reality display viewed by the user. This display shows a portion of a 3D scene model that is visible to the user based on the user's current pose. The 3D scene model is the model of the virtual world that the user navigates through by changing pose.

The scene renderer generates one or more 2D projections from the 3D scene model. In one or more embodiments, these projections may be generated using well known 3D graphics techniques, for example using virtual cameras and perspective projection transformations onto the view planes of the virtual cameras. The 2D projections are then transmitted to the displays.

In addition, one or more embodiments of the system include an image warper. The image warper is the system component that provides for low-latency virtual reality display via efficient rerendering of scenes. The image warper may for example monitor the pose changes of the user and rerender displayed images based on these pose changes. The rerendering performed by the image warper may be a rerendering approximation, rather than a full perspective projection from the original 3D scene model. For example, some embodiments perform rerendering approximations by warping display images in relatively simple ways to partially reflect the changes in the user's pose. These rerendering approximations may offer lower latency display updates, although in some embodiments they may not be fully realistic compared to the full rendering process.

One or more embodiments of the system perform approximate rerendering by calculating a pixel translation vector, and then translating pixels of the display by this pixel translation vector. Effectively the image warper in these embodiments may shift pixels in a calculated direction and by a calculated amount to approximate the effect of the user's movements on the display. This approximation is not full 3D rendering, but it can be performed very quickly in some embodiments, greatly reducing latency between user's movements and display updates.

One or more embodiments of the system may use hardware acceleration to modify the pixels of a display to perform approximate rerendering. For example, display hardware or graphics processing unit hardware may support commands to directly shift pixels based on a pixel translation vector. Implementing pixel translations or other approximate rerendering transformations in hardware may further reduce latency in one or more embodiments.

In one or more embodiments, the rerendering approximations performed by the image warper may only be performed if the pose changes of a user are below a particular threshold value. For large changes in pose, the approximations used by the image warper may become inadequate, and it may be preferable to perform a full 3D rendering despite the high latency. For small changes in pose, the rerendering approximations may be sufficiently realistic.

In one or more embodiments, multiple pose changes for a user may be received while a full 3D rendering process is executed. By the time the 3D rendering process has completed, the initial user pose that was used for the rendering may be out of date, since newer pose data is by then available. One or more embodiments may perform a post-rendering correction on the rendered images, using the image warper to apply updates to the rendered images prior to displaying them. These post-rendering corrections may improve synchronization between the displayed images and the user's current pose.

One or more embodiments of the system may use pose prediction to calculate or estimate the pose of a user at a future time when the rendering and display processes are complete. Pose prediction may reduce the apparent latency between changes in user pose and corresponding display updates. One or more embodiments may use pose prediction for full rendering, for image warping, or for both. Embodiments may use any desired technique for pose prediction, including for example simple extrapolation of pose changes. With pose prediction, the predicted pose is provided to the rendering or approximate rerendering processes, rather than the measured pose. The rendering process calculates virtual camera poses from the predicted pose values, and renders a scene based on these virtual camera poses. The image warper calculates pose changes using the difference between the predicted future pose and the previously calculated virtual camera pose from full rendering of the scene.

One challenge faced by some embodiments is that the image warping process may leave holes in the display images with missing pixels. For example, if all pixels are shifted to the right, then the left edge of the display will have a hole without pixel data. Embodiments may employ various approaches to handle these holes. In one or more embodiments, the 3D renderer may render 2D projections that are larger than the display area. Pixels outside the display area may be cached in these embodiments in an off-screen cache, and retrieved when performing image warping to fill holes.

Another approach to filling holes employed by one or more embodiments is to estimate pixel values for the holes based on the pixel values of nearby pixels. For example, in one or more embodiments pixel values from the boundaries of regions may be propagated into the holes to fill them. Simple propagation of boundary pixels into holes may in some cases result in visual artifacts. In one or more embodiments, blur transformations may be applied to pixels in the holes or near the holes to reduce these artifacts.

One or more embodiments may employ various types of rerendering approximations for image warping. One technique used by some embodiments is to generate a simplified 3D model from the 2D projections received from the scene rendered, and to reproject these simplified 3D models onto the updated view planes that correspond to changes in the user's pose. For example, one or more embodiments may create a simplified 3D model by mapping a 2D projection from rendering onto another plane in the simplified 3D model, where the distance of this plane from the user reflects an average or typical depth of the objects in the complete 3D scene model. The depth of such an average plane may be fixed, or it may be supplied by the scene renderer with each 2D projection. One or more embodiments may use other simplified 3D models, such as spherical or cylindrical surfaces for example.

For small changes in pose, rerendering approximations based on reprojecting from a simplified 3D planar model may be approximately equivalent to using a pixel translation vector to shift pixels in display images in response to pose changes. For example, one or more embodiments may calculate a pixel translation vector for a rotation of a user around axis $\hat{\omega}$ by a small angle $\Delta\theta$ as $(\hat{\omega}_y \Delta\theta, -\hat{\omega}_x \Delta\theta)$, which is then scaled to the reflect the pixel dimensions of the display. This formula reflects that small angular rotations of a user's view approximately result in pixels shifting in response to the rotations, with the amount of shift proportional to the angle of rotation. Changes in user pose may also involve translations (linear motions of the user). For translations, the amount of shifting of pixels is also a function of the distance of objects from a user: the closer the object to the user, the more pixels shift in response to user translations. In one or more embodiments, a rerendering approximation may be estimated by a pixel translation vector using an average depth estimate $z^*$ for the distance between the user and the objects in the 2D projection. These embodiments may calculate a pixel translation vector for a user translation by small vector $\Delta r$ as $(-\Delta r_x/z^*, -\Delta r_y/z^*)$, which is then scaled to reflect the pixel dimensions of the display. This formula reflects that objects that are further away shift less than objects that are closer. It also reflects that pixels shift in the direction opposite to the movement of the user. One or more embodiments may user pixel translation vectors for rerendering approximations that combine the above effects of user rotation and user translation, such as for example $(\hat{\omega}_y \Delta\theta - \Delta r_x/z^*, -\hat{\omega}_x \Delta\theta - \Delta r_y/z^*)$.

In summary, one or more embodiments of the invention enable a low-latency virtual reality display by using techniques to efficiently and approximately rerender images based on changes in the user's pose. Such techniques include, but are not limited to, shifting pixels by a pixel translation vector that is calculated from the user's movements. One or more embodiments may provide additional features such as filling of holes generated by image warping, and applying corrections prior to displaying rendered images to synchronize them with the user's current pose.

One or more embodiments of the invention obtain control commands from a user by recognizing gestures. Command gestures may be for example head gestures or they may be motions, positions, or orientations of any body part. One or more control commands may be defined, and some or all of these commands may be associated with one or more user gestures. One or more embodiments may have a gesture recognizer that receives pose data for one or more body parts of the user, and analyzes this data to determine whether any of the defined gestures has been performed. Embodiments may have a control state that includes any variables or data structures that may affect the virtual reality experience. Control commands obtained via gesture recognition may modify this control state in any desired manner. Based on the control state, any desired modifications may be made to the 3D model of a scene, to the rendering process that generates 2D projections of the scene, or to the rendered images displayed on the system displays.

In one or more embodiments the interpretation of a motion or change in pose may depend on a mode in the system control state. One or more embodiments may define a command mode flag in the control state that determines whether certain motions will be interpreted as commands. A gesture may be used to enter or exit command mode.

Gesture recognition may for example use gesture motion patterns defined for the gestures associated with commands. These gesture motion patterns may for example describe the motions algorithmically or in a specified data structure. Some gesture motion patterns may require tracking the pose of a user over time, and comparing the time series of pose data to the gesture motion patterns.

One or more embodiments may recognize gestures of any body part of a user. For example, one or more embodiments may recognize head gestures, where the user moves his or her head in a particular pattern. Illustrative head gestures may include, for example, without limitation, turning the head left or right or up or down at an angular velocity exceeding a threshold value, or turning the head left then right, right then left, up then down, or down then up quickly over a time interval below a threshold value.

One or more embodiments may associate any command with any gesture or gestures. Commands may alter or query the system in any desired manner. For example, without limitation, gesture-based commands may switch the 3D model of a scene from one model to another. Gesture-based commands may for example modify the time evolution of a virtual environment, for example by starting, pausing, rewinding, or fast forwarding this time evolution. Gesture-based commands may for example alter a user's location in a virtual environment.

One or more embodiments may use gestures to obtain a user selection from a user input control such as for example a menu. For example, a specific gesture may be used to enter a user input mode. This user input mode may cause a user selection menu or input control to be displayed on the system's display, for example as an overlay onto the virtual reality image. While in input mode, gestures of the user may modify the user's selection. In one or more embodiments changes in user pose while in input mode may not alter the virtual reality image. For example, if a user looks at a menu item in a menu, that gesture may select that menu item, potentially without altering the display image other than to indicate the selection. Remaining at a selection for a specified period of time may for example complete the selection and exit input mode. In one or more embodiments a specific gesture may be used to complete a user input.

One or more embodiments may use sensors on multiple body parts of a user, and associate movements of one or more of these body parts with command gestures. For example, without limitation, one or more embodiments may obtain pose data for a user's head, and for a second body part. A second body part may be for example, without limitation, a hand or wrist of a user. One or more embodiments may obtain pose data for a user's wrist using for example a smart watch or a fitness band as a wrist motion sensor. In one or more embodiments command gestures may be associated with a second body part, such as a wrist, and head motions may be used to determine the user's viewpoint in the virtual reality environment.

BRIEF DESCRIPTION OF THE DRAWINGS

The above and other aspects, features and advantages of the invention will be more apparent from the following more particular description thereof, presented in conjunction with the following drawings wherein:

FIG. 8A shows a swimlane diagram for an embodiment of the system that use pose prediction to reduce apparent latency between pose changes and display updates.

FIG. 9 illustrates an embodiment of the system that renders a scene larger than the display into an offscreen buffer, in order to fill holes generated by low-latency rerendering transformations.

FIG. 21 illustrates an embodiment of the system with a specific gesture to place the system into a user input mode with a screen overlay; in this mode other gestures may modify a user selection or user input.

FIG. 23 shows illustrative operation of the embodiment of FIG. 22, where head motion controls the point of view in the virtual world and wrist motion gestures are associated with control commands.

DETAILED DESCRIPTION OF THE INVENTION

A virtual reality system with control command gestures will now be described. In the following exemplary description numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

Figure 1:
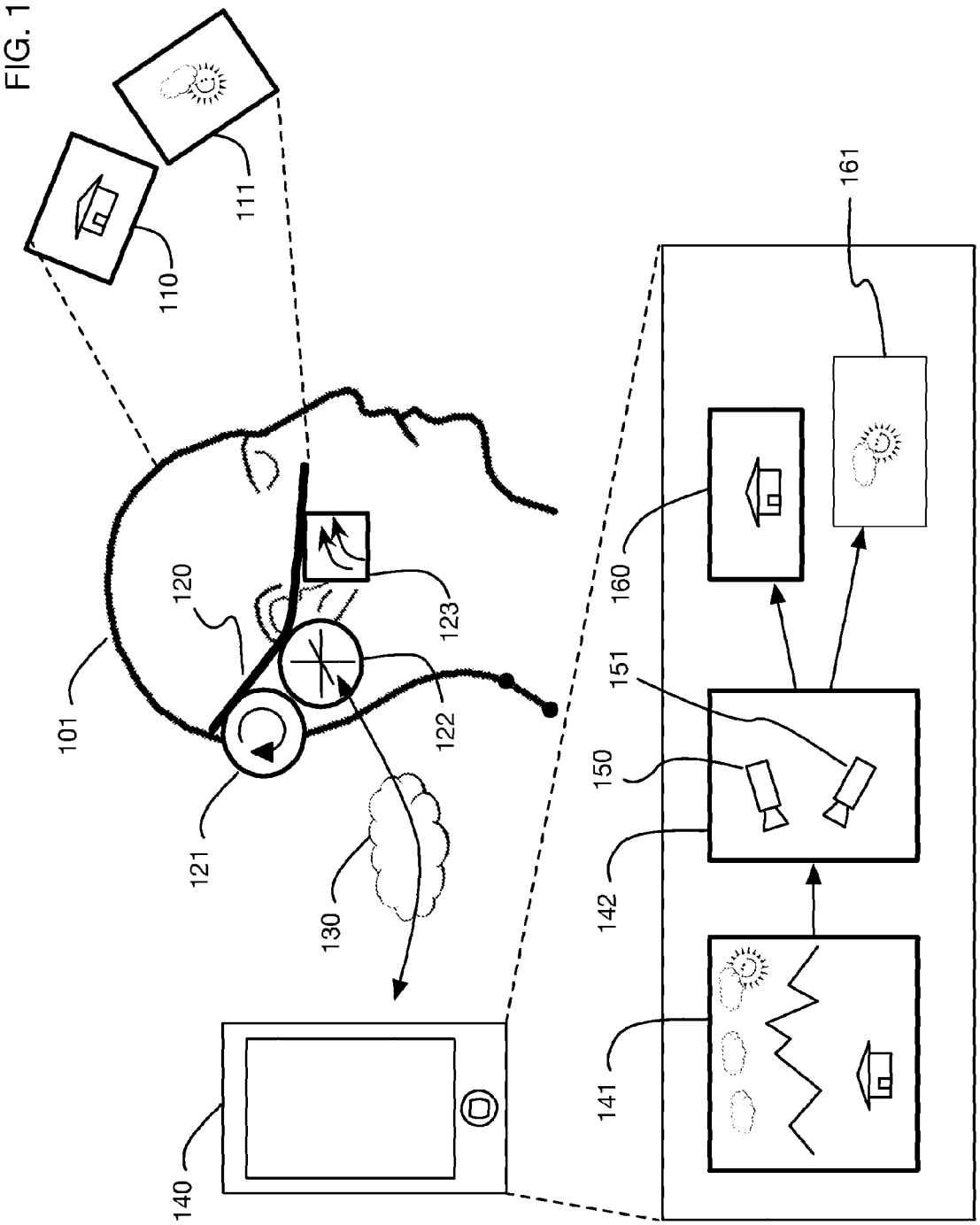
FIG. 1 illustrates the key components of at least one embodiment of low-latency virtual reality display system, configured for illustration with displays, sensors, and some processing modules embedded in virtual reality goggles, and rendering performed by a wirelessly connected mobile device.

FIG. 1 shows a high-level schematic diagram of an embodiment of the invention that embeds elements of the system into virtual reality goggles. Other embodiments may embed elements of the system into any other devices wearable by or viewable by one or more users. For example, without limitation, one or more embodiments may embed elements of the system into goggles, glasses, sunglasses, monocles, helmets, visors, binoculars, contact lenses, or ocular implants. Some embodiments may not be worn by users, but may be placed on walls, in televisions, in mirrors, on ceilings or floors, inside flight simulators or other simulators, in windshields, in windows, or in or on any other location where a virtual reality experience is desired.

In FIG. 1, user 101 wears a head-mounted device 120 that incorporates several elements of the embodiment shown. Displays 110 and 111 are in front of the user's left and right eyes, respectively. These displays are shown offset from user 101 for exposition; in reality many embodiments may position displays of head-mounted devices directly in front of the user's eyes. While the embodiment shown has two displays—one for each eye—embodiments may use any number of displays, including for example only a single display, or two displays as shown in FIG. 1, or more than two displays. In FIG. 1, the images shown on displays 110 and 111 are different; this may be useful in one or more embodiment for example to provide a stereoscopic 3D display. One or more embodiments may use the same image for multiple displays.

Device 120 includes a sensor (or multiple sensors 121). Sensor 121 measures some aspect of the position or orientation of user 101, or of changes thereto. The position and orientation of an object in three-dimensional space is referred to in the art as the "pose" of that object. Hence sensor 121 is a type of pose sensor. One or more embodiments may measure any desired aspects of the pose of any body parts of user 101. For example, in some embodiments sensor 121 may measure the pose of the user's head. In some embodiments sensor 121 may measure the pose of one or more of the user's eyes. Combinations of pose measurements for different body parts may also be used in one or more embodiments. Examples of sensors that may be used in one or more embodiments include, without limitation, accelerometers, gyroscopes, GPS trackers, ultrasonic rangefinders, pressure sensors, video cameras, altimeters, radars, sonars, magnetometers, flow meters, Doppler shift meters, or tilt sensors. Embodiments of the system may use only a single sensor, or multiple sensors. Some embodiments may use one or more sensors that directly measure some aspect of the pose of a body part of the user; for example, a magnetometer may provide partial orientation information directly. Some embodiments may use one or more sensors that indirectly measure pose; for example, a gyroscope may measure angular velocity, which must be integrated to yield orientation. The schematic of FIG. 1 shows sensor 121 located near the back of the head of user 101; this location is arbitrary and may vary in different embodiments of the invention. For example, an embodiment that uses a video camera eye tracker to measure the orientation of a user's eye may be mounted near the user's eyes. One or more embodiments may use multiple sensors at different locations of a user's body. One or more embodiments may use sensors that are not mounted on the user's body at all, but that measure some aspect of the pose of a user or one or more of the user's body parts. For example, one or more embodiments may use video cameras located near the user, and may analyze images from these cameras to determine the user's pose.

In FIG. 1, device 120 also includes pose analyzer 122. This element receives sensor data from the sensor or sensors 121, and uses this data to calculate the pose of one or more body parts of user 101. The calculations made by pose analyzer 122 will in general depend on the type of sensor or sensors 121. For example, one or more embodiments may use inertial sensors for the sensors 121, in which case the pose analyzer 122 may execute an inertial tracking algorithm to estimate the position and orientation of the user. Such inertial tracking algorithms are well known in the art. Embodiments may use any methodology to translate the raw sensor data into pose information. One or more embodiments may use more than one pose analyzer; for example, an embodiment with eye tracking sensors may use a separate pose analyzer for each eye. While FIG. 1 illustrates an embodiment with pose analyzer 122 mounted on device 120 that is attached to the user, embodiments may use pose analyzers that are not attached to the user, or may use a combination of pose analyzers on a user-mounted device and pose analyzers remote from the user.

In general a virtual reality device generates virtual reality display images based on the user's pose. For example, as a user moves or turns, different images are displayed to simulate the real experience of viewing different parts of a scene. This functionality requires a 3D model of one or more scenes, and a rendering system that renders views of the scene based on the user's pose. In the embodiment shown in FIG. 1, the 3D scene model 141 and the scene renderer 142 are located in mobile device 140. This mobile device 140 communicates with the head-mounted device 120 over a wireless network 130. This separation of functionality between a head-mounted device and a remote device is only illustrative; embodiments may use any desired architecture to organize elements of the system into devices. For example, in one or more embodiments, all elements of the system may be incorporated into a device such as head-mounted device 120 that is worn by a user. In one or more embodiments, all of the elements of the system may be remote from the user: for example, the user's orientation may be detected by video cameras in a room, the pose analyzer and scene renderer may execute on computers in the room, and the rendered images may be displayed on monitors mounted on the walls of the room. In one or more embodiments, the system may be a distributed system with elements distributed over multiple nodes that communicate over a network; for example a 3D scene model may be hosted on a remote server, rendering may be done on a device that is local to the user but not attached to the user, and the sensors and displays may be on a user-mounted device. Embodiments may use any type of network communication between elements of the system, including wired or wireless networks, or combinations thereof. Any network media and network protocols may be used to communicate between elements of the system.

3D scene model 141 contains a 3D representation of the objects that may be displayed to the user; it is a model of the 3D "virtual world." This scene model may be static, or it may change over time. Dynamic 3D scene models may also change in response to user actions or to changes in user pose. The 3D scene model may include computer-generated elements, real scene data captured by cameras or 3D scanners, or combinations of computer-generated and real data. Embodiments may use any desired type of 3D scene model, and any desired data representation for the scene model such as for example, without limitation, VRML, X3D, OBJ, COLLADA, Blender, 3DS, or any other proprietary or open format for 3D information.

Scene renderer 142 generates one or more rendered 2D images from scene model 141. In one or more embodiments of the system, the scene render generates one or more "virtual cameras" based on the pose data received from pose analyzer 122. These virtual cameras have a location and orientation in the 3D space defined by the 3D scene model. In the embodiment shown in FIG. 1, scene renderer 142 generates two virtual cameras 150 and 151, each of which corresponds to one of the two displays 110 and 111. Embodiments may use any number of virtual cameras and associate these virtual cameras in any desired manner with displays. Rendering generates a 2D projection for each of the virtual cameras. Techniques for rendering 2D projections from 3D scenes are well known in the art, and these techniques are implemented in many readily available software libraries and graphics processing units. Embodiments may use any of the well known techniques, software packages, or devices for 3D rendering to generate 2D projections. In the embodiment illustrated in FIG. 1, virtual camera 150 generates 2D projection 160, and virtual camera 151 generates 2D projection 161. 2D projections 160 and 161 are transmitted back to device 120 over network 130. These projections may be displayed directly on displays 110 and 111.

In the embodiment shown in FIG. 1, device 120 includes image warper 123. The image warper provides a low-latency "rerendering" of the projections 160 and 161 for certain types of changes in the user's pose. Specifically, the image warper receives data on the virtual camera poses 150 and 151 that were used to generate projections 160 and 161. It also receives updates to the user's pose from pose analyzer 122. By comparing the user's new pose to the virtual camera poses used to render the 2D projections, the image warper calculates a change in pose. When a user's pose changes, the full rendering path to generate new 2D projections would require another iteration of the original rendering path: pose data would be sent to device 140, and converted to virtual camera poses 150 and 151; then scene renderer 142 would generate new 2D projections from 3D scene model 141, and transmit these new 2D projections back to device 120. This full rendering path may be relatively slow, leading to observable latency for the user. The function of the image warper is to reduce this latency by performing a rapid "rerendering approximation" that provides a relatively quick and efficient update to the images 110 and 111 based on changes to the pose. This rerendering approximation is not a complete rendering as would be performed by the scene renderer 142; instead it uses approximations to reduce the calculations and communications required to update the display, thereby reducing latency. Illustrative details of how various embodiments may perform image warping are provided below.

Figure 2:
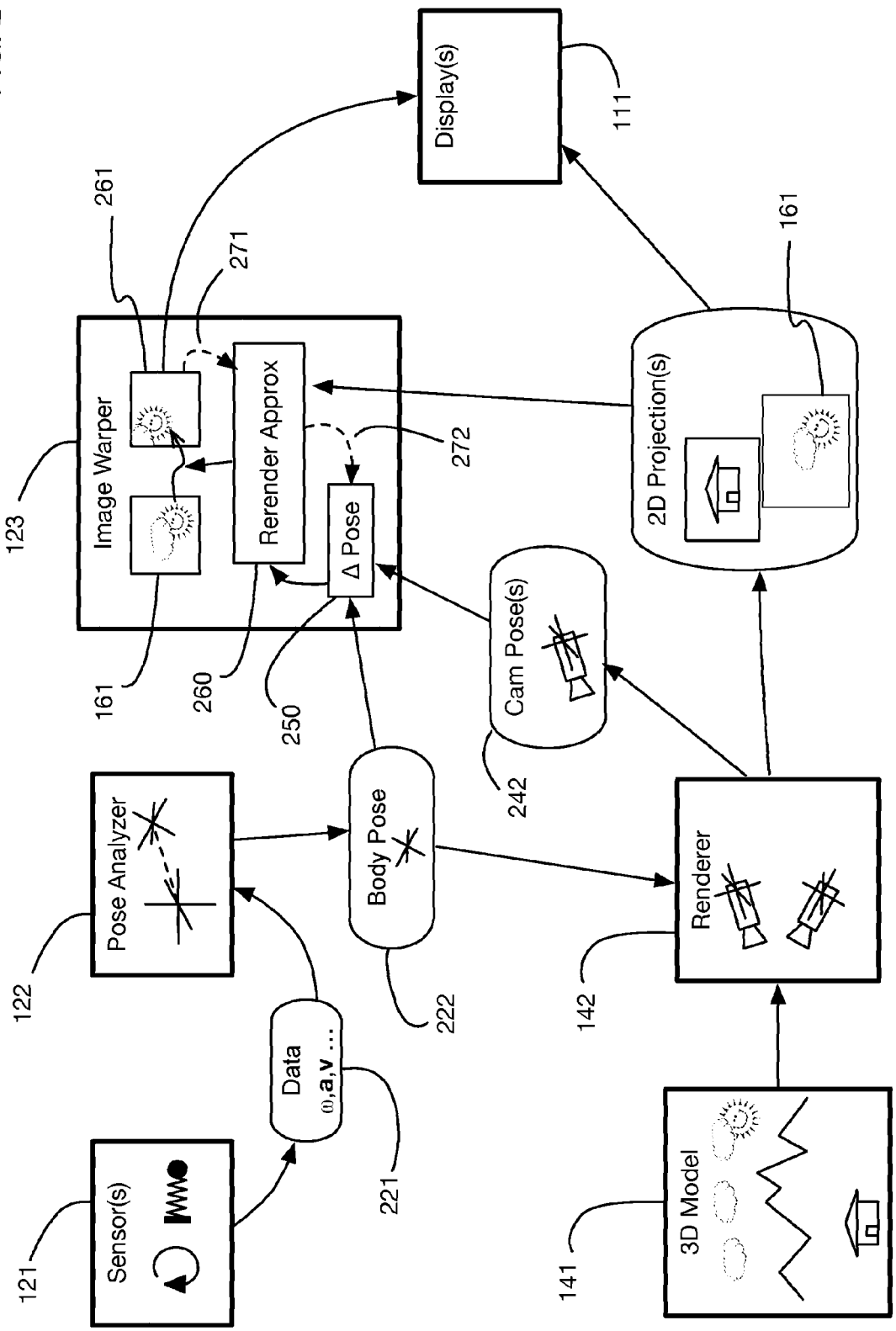
FIG. 2 shows a high-level architectural view of the embodiment shown in FIG. 1.

FIG. 2 shows a conceptual block diagram of the embodiment of FIG. 1, illustrating the main data paths. Sensor (or sensors) 121 generate sensor data 221. This sensor data may include, for example, angular velocity data, acceleration data, velocity data, or any other data generated by any of the types of sensors discussed above or any sensor that may measure any aspect of the pose of a user's body part. The sensor data 221 is sent to pose analyzer 122, which generates body pose 222 from the sensor data. Body pose 222 may include multiple poses, depending on the embodiment; for example in one or more embodiments with eye trackers, body pose 222 may have a separate pose for each of the user's eyes. Body pose 222 is sent to scene renderer 142, which takes 3D scene model 141, and renders one or more 2D projections such as 161. 2D projections 161 are sent to displays 111. The scene renderer 142 also generates virtual camera poses 242 for the virtual camera or virtual cameras used to generate the 2D projections. For some subsequent changes in pose, the new body pose 222 and the virtual camera pose 242 may be sent to image warper 123. Embodiments may use various techniques to determine when, whether, and how to use rerendering via the image warper vs. full rendering iterations via the scene renderer. Image warper 123 calculates a change in pose 250. The change in pose 250 and the original 2D projections 161 are sent to the rerendering approximation 260, which performs the image warper to transform 2D projection 161 into modified 2D projection 261, which is then sent to display 111. In some embodiments the rerendering approximation process may be repeated multiple times before another full rendering of the scene. Embodiments may employ various techniques for repeated rerendering approximations. In some embodiments for example the repeated rerendering may be "iterative": warped projection 261 may be sent back to the rerendering approximation 260 on path 271, for another iteration of warping when a new body pose 222 is available. In these iterative embodiments of repeated rerendering, the pose of the last warped image may also be provided on path 272 to the pose change calculation 250 so that pose changes represent only the change from the last warped image. In other embodiments the repeated rerendering may instead by "cumulative": original 2D projection 111 may be saved, and repeated rerendering approximations may be performed on the original projection rather than on the last warped image. Some embodiments may employ combinations of these iterative and cumulative rendering approaches.

Figure 3:
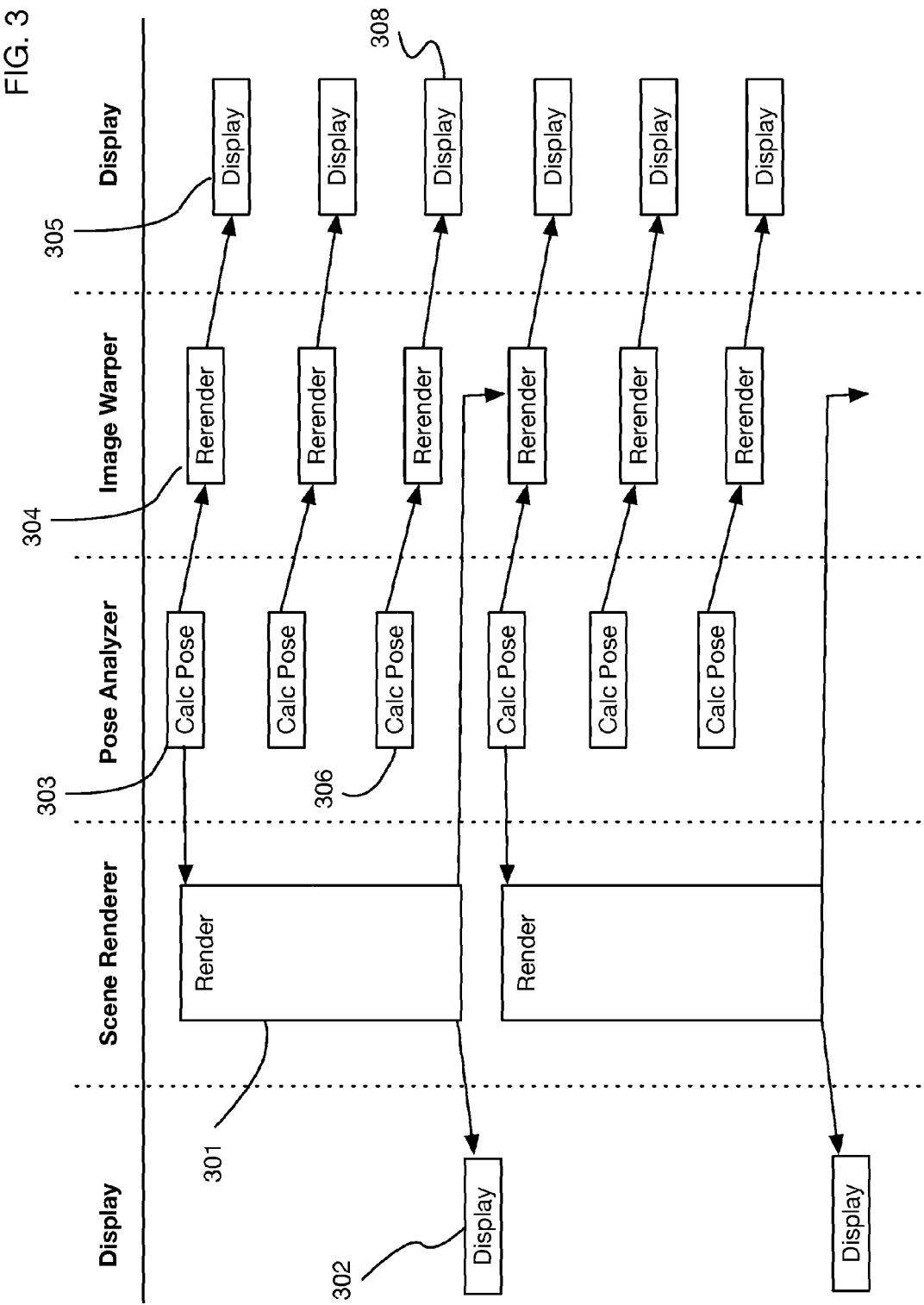
FIG. 3 shows a swimlane diagram for the major rendering activities of the embodiment shown in FIG. 2.

FIG. 3 shows an illustrative "swimlane" process timing diagram of some of the key steps described above. This diagram presumes that a 3D scene has been previously rendered and is currently displayed on the displays. Initially the Pose Analyzer calculates a pose at 303, and sends this pose to the Scene Renderer. The Scene Renderer launches a Render process 301 which is time-consuming. If the system waited for the Render process 301 to complete, the display would not be updated until the new display 302 is available. To provide a lower latency display that is responsive to user's movements, the Pose Analyzer sends the pose 303 to the Image Warper as well. The Image Warper executes a rapid Rerender process at 304 to modify the current display based on the change in pose. This Rerender process finishes quickly resulting in new display 305. This example illustrates how the Image Warper provides for a lower latency virtual reality display, by executing a fast, approximate rerendering to update a display rather than waiting for a time-consuming full rendering process.

In FIG. 3, this process of rerendering repeats a second time while the Render process 301 is calculating, and then a third time when pose calculation 306 is sent to the Image Warper for rerendering, to generate display 308. After Render 301 is complete, the new 2D projection is available for subsequent rerendering steps. In this illustrative embodiment, full Rendering 301 and approximate Rerendering 304 are interleaved. Some embodiments may employ different strategies to mix full rendering and approximate rerendering as desired. The timing shown in FIG. 3 of three approximate rerendering steps occurring while full rendering is executing is simply illustrative; embodiments may employ any desired or required frequency and timing of these steps based on latency requirements, processor capacity, and the types of rerendering approximations used.

Figure 4:
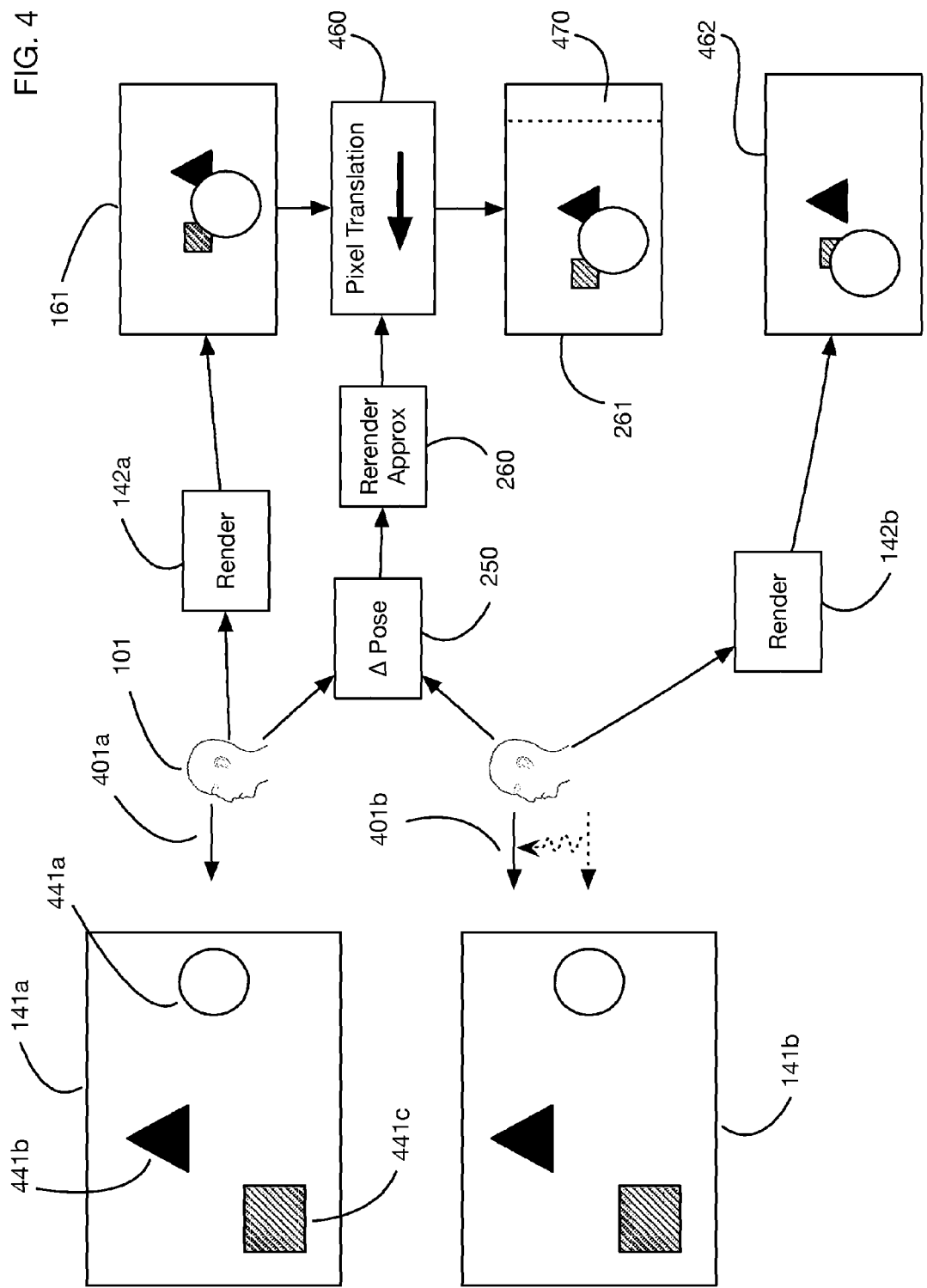
FIG. 4 illustrates an embodiment of the system that implements low-latency rerendering using a pixel translation.

Embodiments of the system may employ various types of approximate rerendering techniques to achieve the desired latency. In one or more embodiments, the approximate rerendering consists of or includes a pixel translation that simply shifts all pixels of the 2D projection by an appropriate pixel translation vector. One advantage of this approach is that pixel translation can be executed very rapidly; for example in some embodiments it may be achieved simply by modifying an offset address for the display memory used by a graphics processing unit. In some embodiments pixel translation may be supported directly by the display hardware. FIG. 4 illustrates an embodiment that uses a pixel translation vector for rerendering approximation. Initially user 101 has a pose indicated by view vector 401a. The user is observing 3D scene model 141a, which includes for illustration three objects: a sphere 441a, a pyramid 441b, and a box 441c. (These objects are illustrated in two dimensions in FIG. 4 for simplicity, but in general the 3D scene models may contain three dimensional shapes.) The objects are located at different distances from the user 101, with 441a closest and 441c furthest away. The render process 142a generates 2D projection 161. As illustrated in 161, the rendering process shows the depth of the various objects, with the sphere 441 appearing largest since it is closest to the user. The rendering process also reflects occlusion of objects; since sphere 441a is in front, it partially obscures objects 441b and 441c.

After this initial rendering, user 101 moves to the right, with new view vector 401b. The new pose of the user (which reflects the new view vector) is compared to the original pose with the pose change comparator 250. This pose change is sent to the approximate rerender 260, which calculates a pixel translation vector 460 that approximates the change to the 2D projection based on the user's movement. Since the user moved to the right, the pixel translation vector is a shift of pixels leftwards. Applying the pixel translation vector 460 to the original 2D projection 161 results in modified image 261. All pixels in the scene are shifted left by the same amount.

FIG. 4 also illustrates how the rerendering approximation differs from a full rendering based on the new pose. If the new pose 401b is sent to the Scene Rendering process 142b, the resulting 2D projection is 462. This new 2D projection is a fully accurate representation of the user's new view. For example, in the updated 2D projection 462, the sphere 441 shifts leftward more than the box 441c, since it is closer to the user. Because the rendering process 142b takes the depth of the objects into account in rendering the scene, these relative shifts are correctly rendered. In contrast, the approximate rerendering 260 via pixel translation vector 460 captures the basic movement of the scene—the user moves right so the pixels shift left—but it is nevertheless an approximation that does not take into account the 3D scene model. The advantage of the approximate rerendering is that it can be performed very quickly, particularly with pixel translations, resulting in low latency display that is very responsive to the user's movements. Different embodiments of the system may mix full rendering and approximate rerendering as needed or desired to make the appropriate tradeoffs between accuracy and low latency based on the application.

Figure 4A:
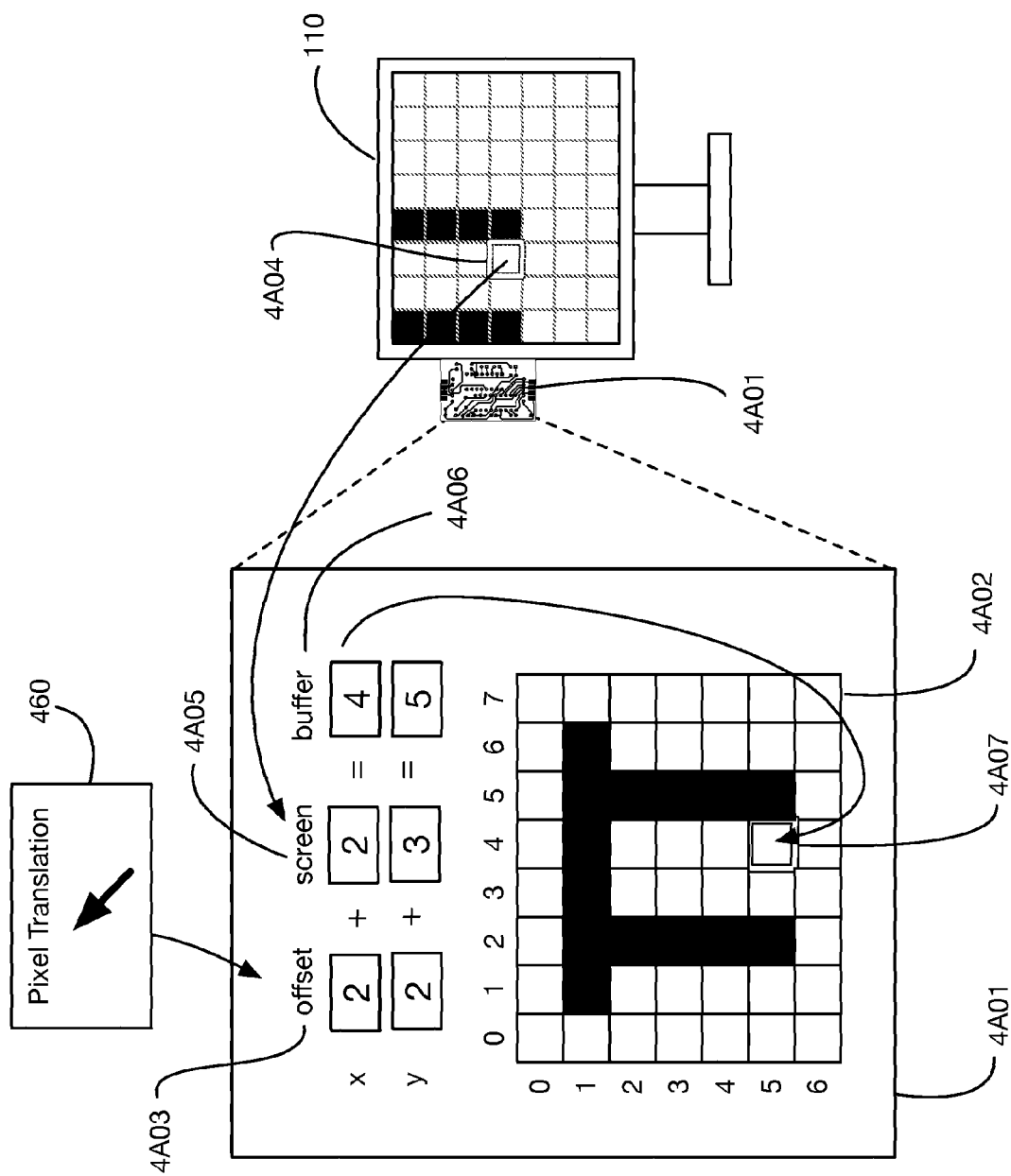
FIG. 4A illustrates an embodiment of the system that uses hardware accelerated rerendering using offset registers for reading frame buffer memory.

One or more embodiments of the system may use hardware acceleration to modify the pixels of a display to perform pixel translations or other image warping operations. FIG. 4A illustrates an example of an embodiment with hardware support for pixel translation in the monitor hardware. In some embodiments hardware support may be provided in graphics processing units or in other system components as well. In FIG. 4A, monitor 110 includes hardware 4A01 that drives the monitor output. This hardware has direct support for implementing pixel translation 460. The monitor hardware includes a frame buffer 4A02 that stores pixel values. To display the pixel value at a screen address 4A05, corresponding for example to pixel 4A04 on the display 110, the hardware adds offsets 4A03 to the screen address 4A05 to obtain a frame buffer address 4A06, which in this example points to frame buffer pixel 4A07. The offset 4A03 is set based on pixel translation 460. Changes to the pixel translation can be rerendered very quickly by the display hardware by updating the offset 4A03. In one or more embodiments the display hardware may provide support for additional image warping features, such as for example filling of holes with interpolated pixel values, blurring of edge regions, rotations in addition to translations, or any other desired warping transformations. One or more embodiments may provide hardware acceleration in other system components instead of or in addition to in display hardware, such as for example in graphics processing units or in coprocessors.

Figure 5:
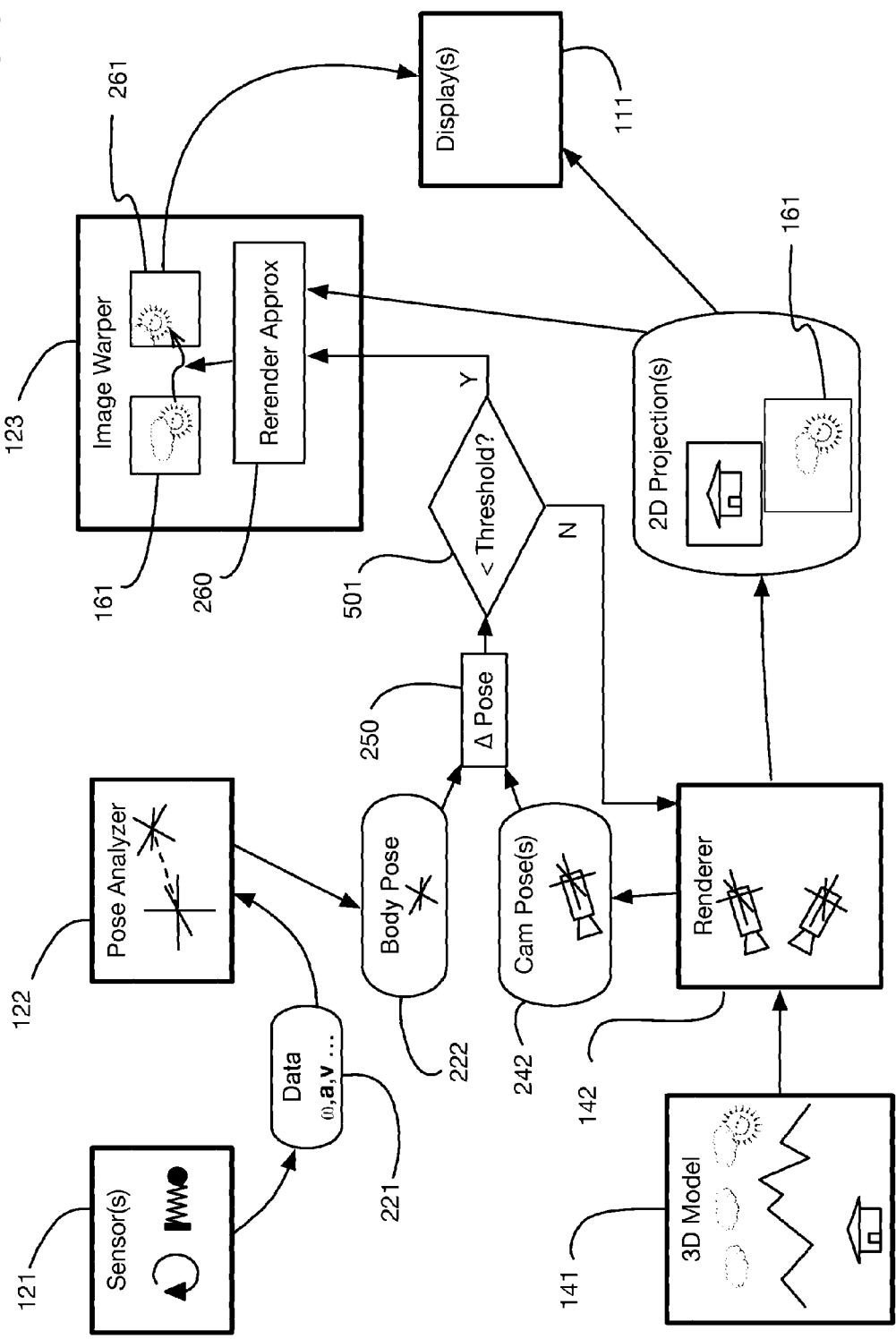
FIG. 5 illustrates an embodiment of the system that executes low-latency rerendering if the changes in a user's pose are below a threshold value.

In one or more embodiments, approximate rerendering may be used only when a user makes relatively small changes in pose. In some cases the accuracy of approximate rerendering may be very good for small changes in pose, but it may be poorer for large changes in pose. Therefore limiting approximate rerendering to small changes in pose may be appropriate in some embodiments. FIG. 5 illustrates an embodiment that employs this strategy. The virtual camera pose 242 used to generate a previous 2D projection is compared to a user's current pose 222 to generate a change in pose 250. This change in pose is compared at 501 to a threshold. If the change in pose is below a threshold, rerendering approximation 260 is executed for a low latency update to the display; otherwise a full rendering 142 is executed to generate new 2D projections 161. Embodiments may use various methods to compare pose changes to threshold values. For example, for pose changes that are translations, the distance moved by the user may be a metric that is compared to a threshold value. For pose changes that are rotations, the angle of rotation may be a metric that is compared to a threshold value. For pose changes that combine translations and rotations, weighted sums of translation distance and angular change may be compared to a threshold, or translations and angle changes may each be employed to respective thresholds. These examples are illustrative; embodiments may use any desired function to compare pose changes to any threshold value or values to decide when to execute approximate rerendering.

Figure 6:
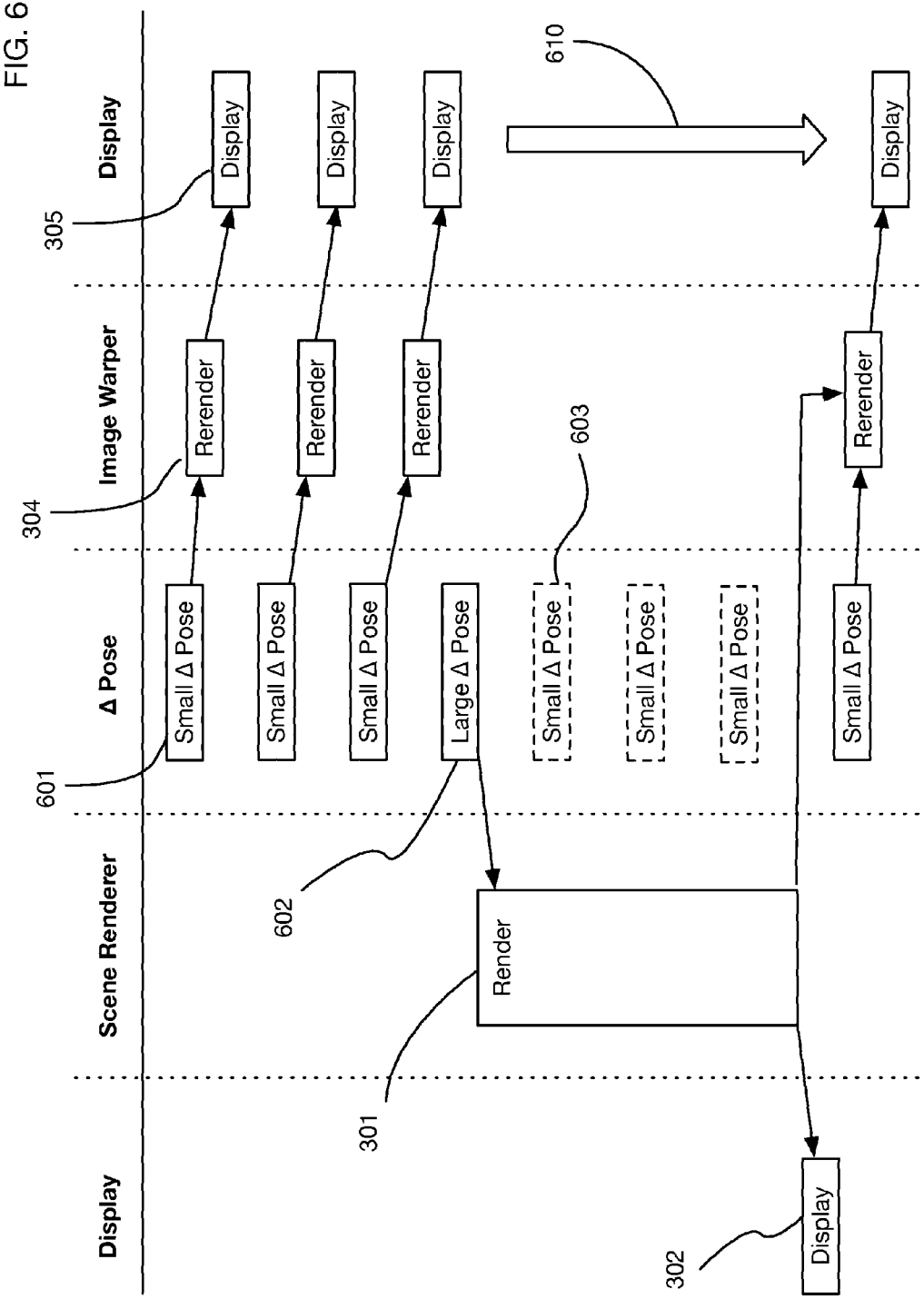
FIG. 6 shows a swimlane diagram for the major rendering activities of the embodiment shown in FIG. 5.

FIG. 6 shows an illustrative swimlane timing diagram for the embodiment shown in FIG. 5 that compares pose changes to a threshold. Pose change 601 is determined to be a small change since it is below the threshold value. Therefore the rerendering approximation 304 is executed to generate display 304. Similarly the next 2 pose changes are small, and rerendering approximations are executed. Afterwards pose change 602 is determined to be large (greater than the threshold); therefore a full rendering operation 301 is initiated. In this illustrative embodiment, the system pauses display updates during time 610 while the rendering process 301 is executing. Thus the next update to the display 302 occurs when rendering 301 is complete.

In some embodiments, naïve parallel interleaving of full rendering and approximate rerendering may result in display updates that appear to be out of sequence. Returning to FIG. 3, the three approximate rerendering steps beginning at 304 execute in parallel with the full rendering process 301. While this parallelism achieves low-latency update of displays (for example at 306 and 308), it may result in timing artifacts that negatively affect the user's experience. For example, the user observes display update 308, which is based on the user's pose 306. Immediately afterwards, the user observes display update 302, which is based on the user's pose 303. Thus the display at 302 may appear to the user to go backwards relative to the most recent display 308 which was generated by a rerendering approximation. For very small changes in pose these artifacts may not be noticeable, but in some embodiments they may compromise the virtual reality experience.

One solution to these timing artifacts is to prevent parallel execution of full rendering and approximate rerendering altogether. Such an embodiment is illustrated in FIG. 6. In this embodiment, approximate rerendering occurs for small pose changes, and full rendering occurs for large pose changes. Moreover, approximate rerendering is paused during full rendering. Thus the user never observes the timing issues that may be visible for example in FIG. 3. However, the embodiment illustrated in FIG. 6 achieves this consistency at the expense of latency: for example the delay 610 in display updates during rendering 301 may be perceived by the user as a lack of responsiveness of the system.

Figure 7:
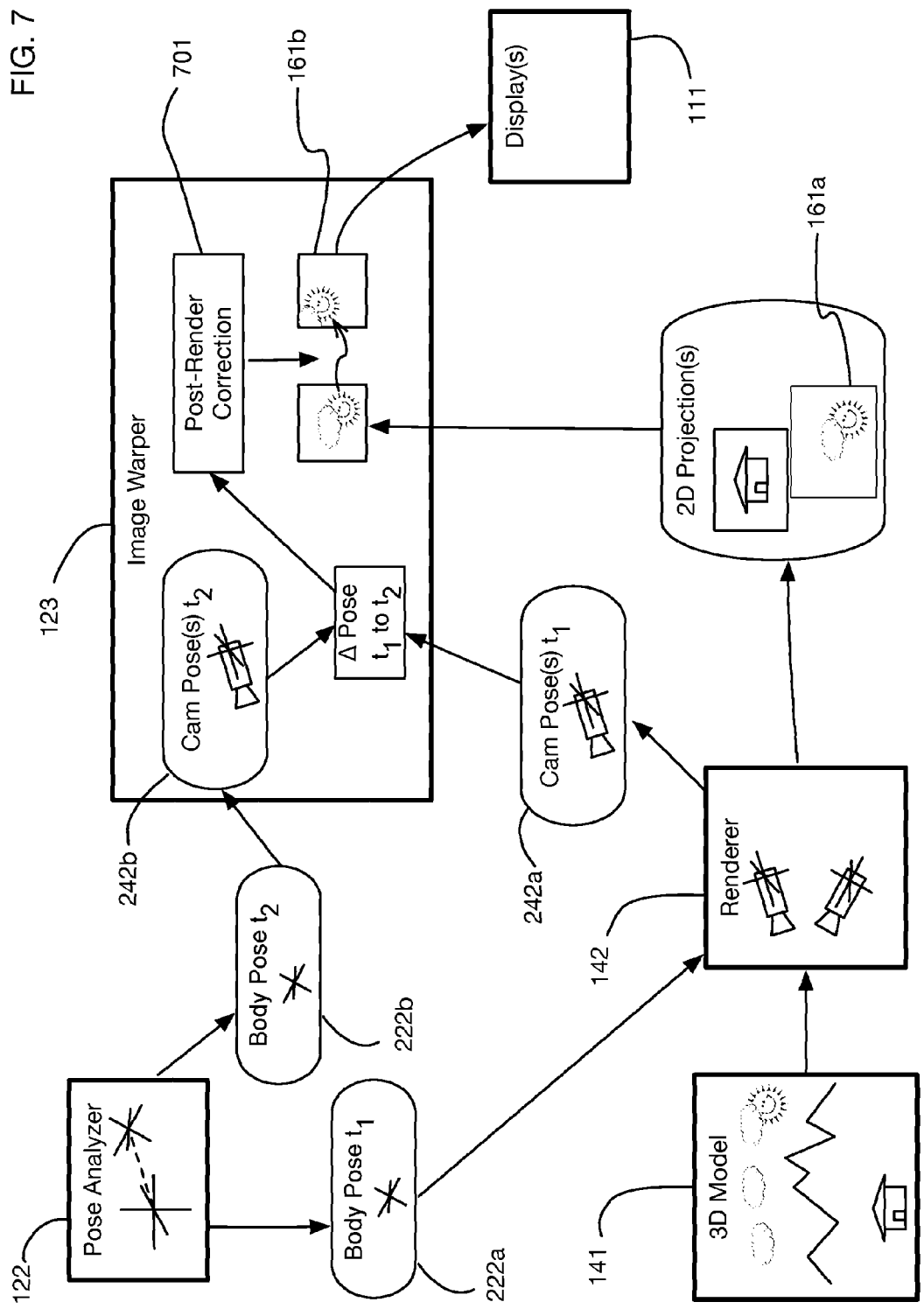
FIG. 7 illustrates an embodiment of the system that performs a post-rendering modification to rendered scenes using a low-latency correction for recent changes in the user's pose.
Figure 8:
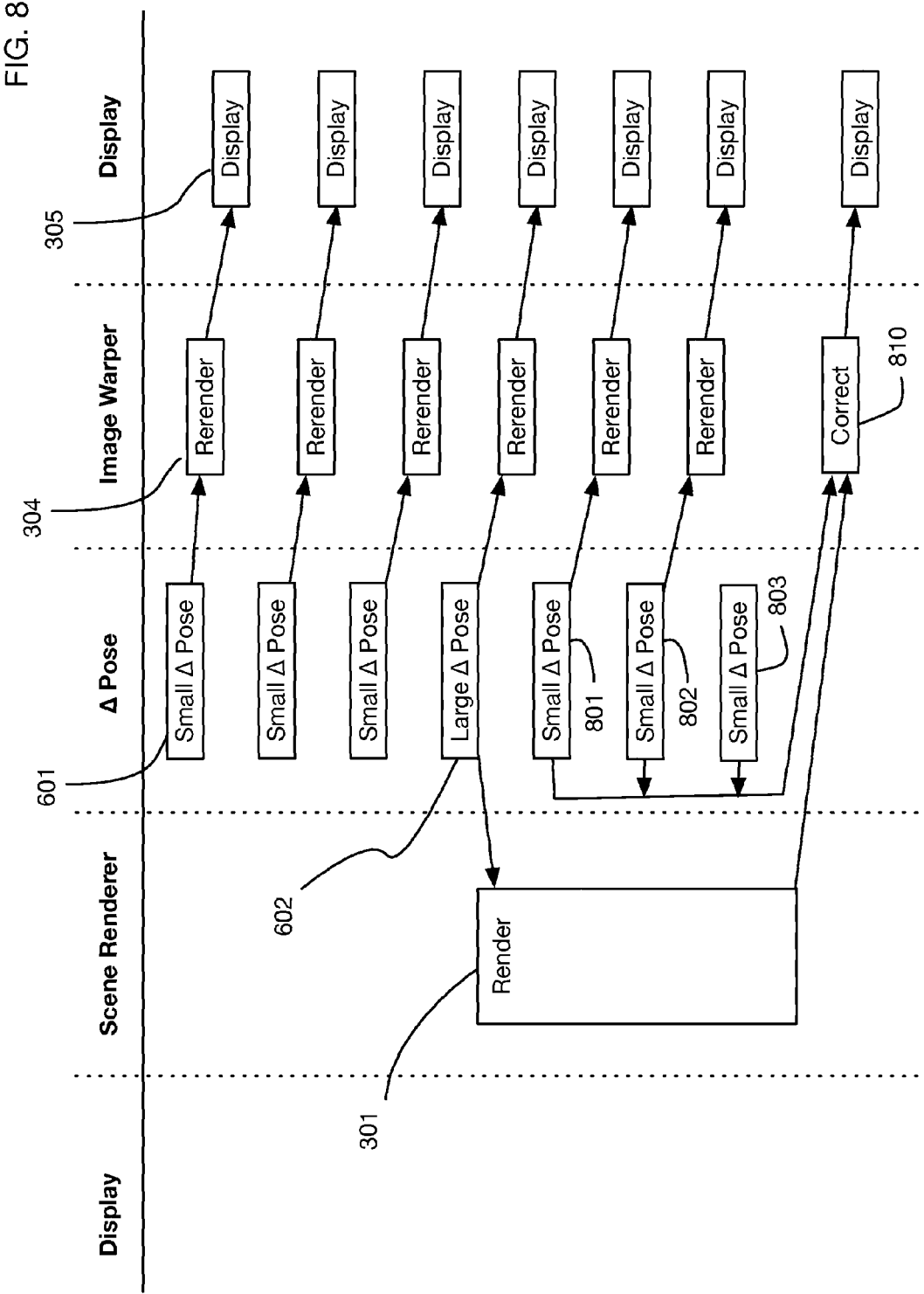
FIG. 8 shows a swimlane diagram for the major rendering activities of the embodiment shown in FIG. 7.

Embodiments of the system may employ a more sophisticated interleaving strategy that achieves consistently low latency without introducing the types of timing artifacts illustrated in FIG. 3. These embodiments generate full rendering in parallel with approximate rerendering, and in addition they perform post-rendering corrections on the fully rendered images to synchronize them with updates that have occurred since the full rendering process began. FIG. 7 illustrates an embodiment that applies post-rendering corrections, and FIG. 8 shows an associated swimlane diagram for the key processing steps. Turning first to FIG. 8, in this illustrative embodiment, small changes in pose generate approximate rerendering, and large changes in pose generate full rendering. For example, pose change 601 is small (compared to a designated threshold value); hence approximate rerendering 304 is executed to generate display update 305, with relatively low latency. Similarly the subsequent two pose changes are small and generate approximate rerendering. Pose change 602 is large; hence the system initiates full rendering 301 which is based on the pose at 602. Because rendering 301 is time-consuming, pose changes 801, 802, and 803 are received during rendering 301. Since each of 801, 802, and 803 are small changes, rerendering approximations are performed to generate display updates for each of these pose changes. After rendering 301 completes, instead of displaying the output of 301 directly, the output of 301 is corrected by process 801 before it is displayed. The correction 810 uses the cumulative pose changes 801, 802, and 803 that occurred after the initiation of 301 to synchronize the display with the most recent pose.

FIG. 7 shows a block diagram of an embodiment that implements the process illustrated in FIG. 8. At time $t_1$ pose 222a is sent to renderer 142. Eventually the renderer generates 2D projection 161a; this projection was based on virtual camera pose 242a, which corresponds to pose 222a at time $t_1$. One or more pose updates have been received and processed between time $t_1$ and the availability of 2D projection 161a; the most recent such update is body pose 222b received at time $t_2$. Therefore the 2D projection 161a is not sent directly to display 111. Instead it is sent to image warper 123, which will correct it for pose changes that have occurred since the beginning of the rendering process. Image warper 123 calculates virtual camera pose 242b corresponding to the most recent body pose 222b, and compares it to the virtual camera pose 242a used for rendering projection 161a. The difference in these virtual camera poses is applied to post rendering correction 701, which modifies 2D projection 161a based on recent pose changes to generate corrected 2D projection 161b, which is sent to display 111. One potential benefit of such an embodiment is that displayed images will reflect the most recent pose data received from the sensors. Another potential benefit is that approximate rerendering may be interleaved in parallel with full rendering for improved latency without introducing timing artifacts.

Approximate rerendering and post rendering correction may significantly reduce the latency between changes in pose and updates to the display that reflect these changes. However, the processes of measuring pose, generating an approximate rerendering, and transferring data to the display, continue to introduce some latency even when these improvements are in place. FIG. 8A illustrates this potential issue. A pose measurement starts at time 8A01 ($t_1$). After pose measurement completes, a rerendering approximation is calculated and transferred to the display; the display update competes at time 8A02 ($t_2$). Although a long-latency full rendering is avoided, there remains elapsed time 8A03 ($\Delta t$) between the start of pose measurement and the completing of the display update. The display update therefore lags the true pose by this amount $\Delta t$.

One or more embodiments may employ pose prediction to further reduce this latency. An example of this approach is illustrated in the lower half of FIG. 8A. A pose measurement 8A05 occurs with resulting pose $Q_1$. Instead of passing this pose $Q_1$ directly to the image warper, the system uses the known delay 8A03 ($\Delta t$) between pose measurement and display to predict what the pose will be at the time 8A30 that the display update will complete. In this illustrative embodiment, an extrapolation of pose changes is made using the previous pose sample 8A04, which measured pose $Q_0$. Assuming sampling interval $\Delta s$ between pose measurements, a pose predication 8A06 is calculated as $Q_2 = (Q_1 Q_0^{-1})^{(\Delta t/\Delta s)} Q_1$. This calculation considers poses to be rigid body transformations of three-dimensional space, with multiplication used to represent composition of these transformations. The predicted pose 8A20 ($Q_2$) is provided to the image warper for the rerendering approximation. Thus the display process which completes at time 8A30 is synchronized with the time of the predicted pose used to generate the display.

This pose prediction calculation 8A06 is an illustrative example; one or more embodiments may use any method to predict a future pose based on one or more previous pose samples and on any other available information. Any method of predicting a future trajectory for the location or orientation of any body part may be used by one or more embodiments. Prediction methods used by one or more embodiments may also for example take into account known constraints on the motion of the user. One or more embodiments may use adaptive pose prediction techniques that monitor the user's movements over time to predict the most likely subsequent movements based on previous movements.

FIG. 8A illustrates the use of pose prediction for image warping. One or more embodiments may use similar pose prediction techniques for full rendering as well. The discussion above for pose prediction for image warping applies to full rendering as well. One or more embodiments may generate a predicted pose that is sent to the full rendering process, where the predicted pose takes into account expected pose changes between the time of the pose measurement and the completion of the display update after full rendering. One or more embodiments may use pose prediction techniques for either or both of image warping and full rendering.

In some embodiments the approximate rerendering transformations applied by the image warper may result in "holes" in the transformed images with missing pixels. For example, returning to the embodiment illustrated in FIG. 4, the image warper shifts pixels to the left via pixel translation vector 460. This results in a "hole" 470 on the right edge of transformed image 261 that is missing pixels. Embodiments may employ various strategies or combinations of strategies to handle these holes. A very simple strategy employed by one or more embodiments is to fill holes with a relatively "neutral" background color; in some applications this may provide sufficient realism for small pose changes. However in other applications this simple approach may not be sufficient.

One or more embodiments may fill holes by rendering 2D projections that are larger than the displays. In these embodiments warping of the larger 2D projection may result in an updated projection that still fits entirely within the display area. FIG. 9 illustrates an embodiment that employs this strategy. In this embodiment, the scene renderer generates an extended 2D projection 901 from 3D model 141; this extended projection is larger than the display area. The displayed image 161 is a subset of the rendered area 901. For illustration we show the effect of an image warper 123 that applies a rightward pixel translation to the image. An embodiment that did not employ a hole-filling strategy would generate transformed image 111a, which has missing pixels in region 911 on the left edge of the display. In the embodiment of FIG. 9, the pixels of the extended rendered projection 901 are saved in an offscreen cache. The image warper then pulls pixels from this offscreen cache as needed to fill holes generated by the warping. In FIG. 9, pixels from the mountain object 920 are pulled from the offscreen cache to fill hole 911, resulting in an improved rerendered projection with object 921 filling the hole. Embodiments may use any desired size and shape for the offscreen pixel cache.

Figure 10:
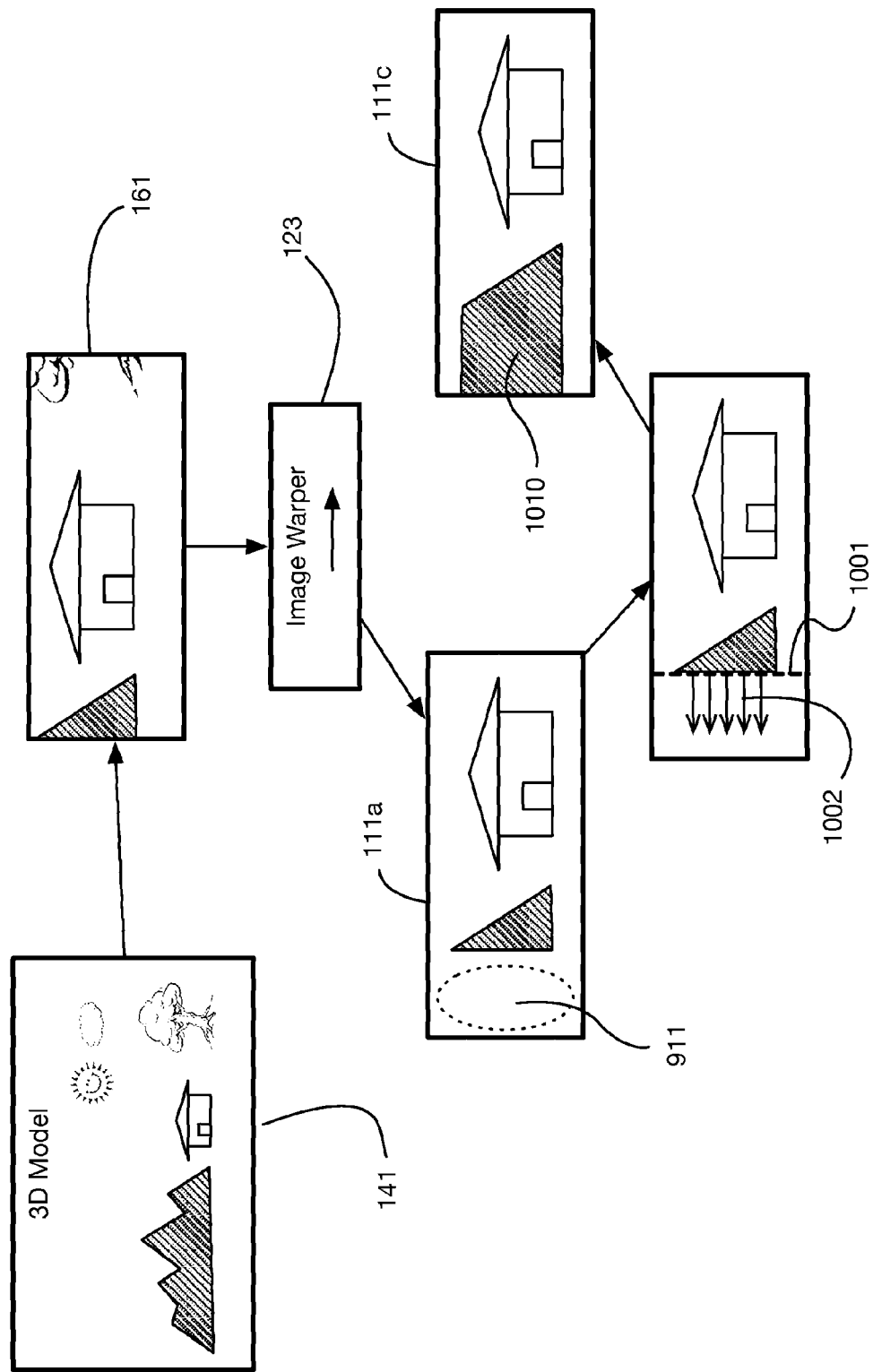
FIG. 10 illustrates an embodiment of the system that fills holes generated by low-latency rerendering transformations by extending pixels from the image boundary.

One potential drawback of the strategy of generated an extended rendered area is that it requires additional processing for the rendering of more pixels; thus it may exacerbate latency issues due to rendering delays. One or more embodiments may employ a hole-filling strategy that instead generates pixel values for the missing pixels based on some features of the warped image. For example, the embodiment of the system illustrated in FIG. 10 fills in pixel values by propagating pixels outward from the boundaries of the warped image into the regions with holes. For illustration, image warper 123 shifts pixels of 2D projection 161 to the right, resulting in hole 911 that is missing pixels. In this embodiment, the image warper finds the boundary 1001 that corresponds to the original left edge of projection 161; it then propagates pixel values from this boundary to the left with propagation 1002. This pixel propagation results in filled region 1010 rather than the hole 911. In this illustrative embodiment, the resulting image 111c has no noticeable hole; however the resulting shape of the mountainous area does not correspond precisely to the shape in the original 3D scene model 141. Nevertheless this simple strategy of propagating pixels from the boundary may provide adequate realism in some applications. One or more embodiments may employ other strategies to approximate pixel values in holes; for example one or more embodiments may locate a series of pixels in the warped image that are relatively close to the location of a missing pixel, and interpolate these pixel values to fill the hole.

Figure 11:
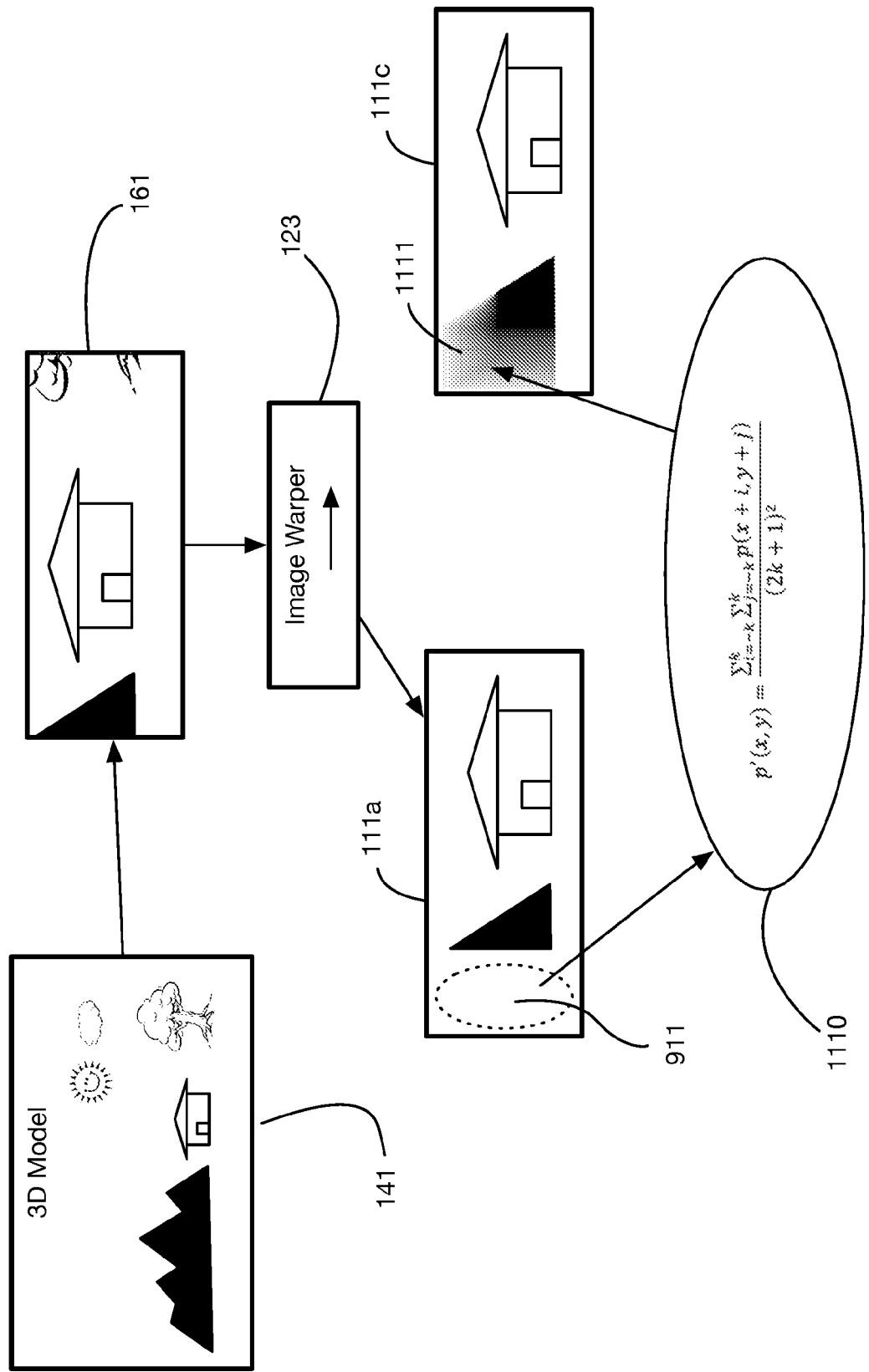
FIG. 11 illustrates an embodiment of the system that fills holes generated by low-latency rerendering transformations by blurring pixels near the image boundary.

Because pixel-filling approaches that propagate pixels from boundaries (or use similar heuristics) result in regions on the edges of displays that are not entirely faithful to the original 3D scene model, one or more embodiments may employ various blurring approaches to make these regions appear less sharp. By blurring the filled in regions, the approximate pixel values may be less noticeable to the viewer. FIG. 11 illustrates an embodiment that utilizes such a blurring. As before, the image warper shifts pixels to the right, resulting in hole 911 in warped image 111a. Then blurring transformation 1110 is applied to the pixels in hole 911. The illustrative blurring transform 1110 simply averages pixel values across a square region center centered at the coordinates of each missing pixel. The resulting blurred region 1111 in 111c has no obvious hole with missing pixel values; moreover the blurring has no obvious artifacts like the flat mountaintop showing in FIG. 10, region 1010. The blurring transformation 1110 which averages values in a local neighborhood is simply illustrative; embodiments may employ any desired transformation on the pixels of regions with holes, or on any pixels near to these regions, to achieve a desired blurring effect. For example, instead of a simple averaging, a Gaussian blur filter may be employed by one or more embodiments.

Figure 12:
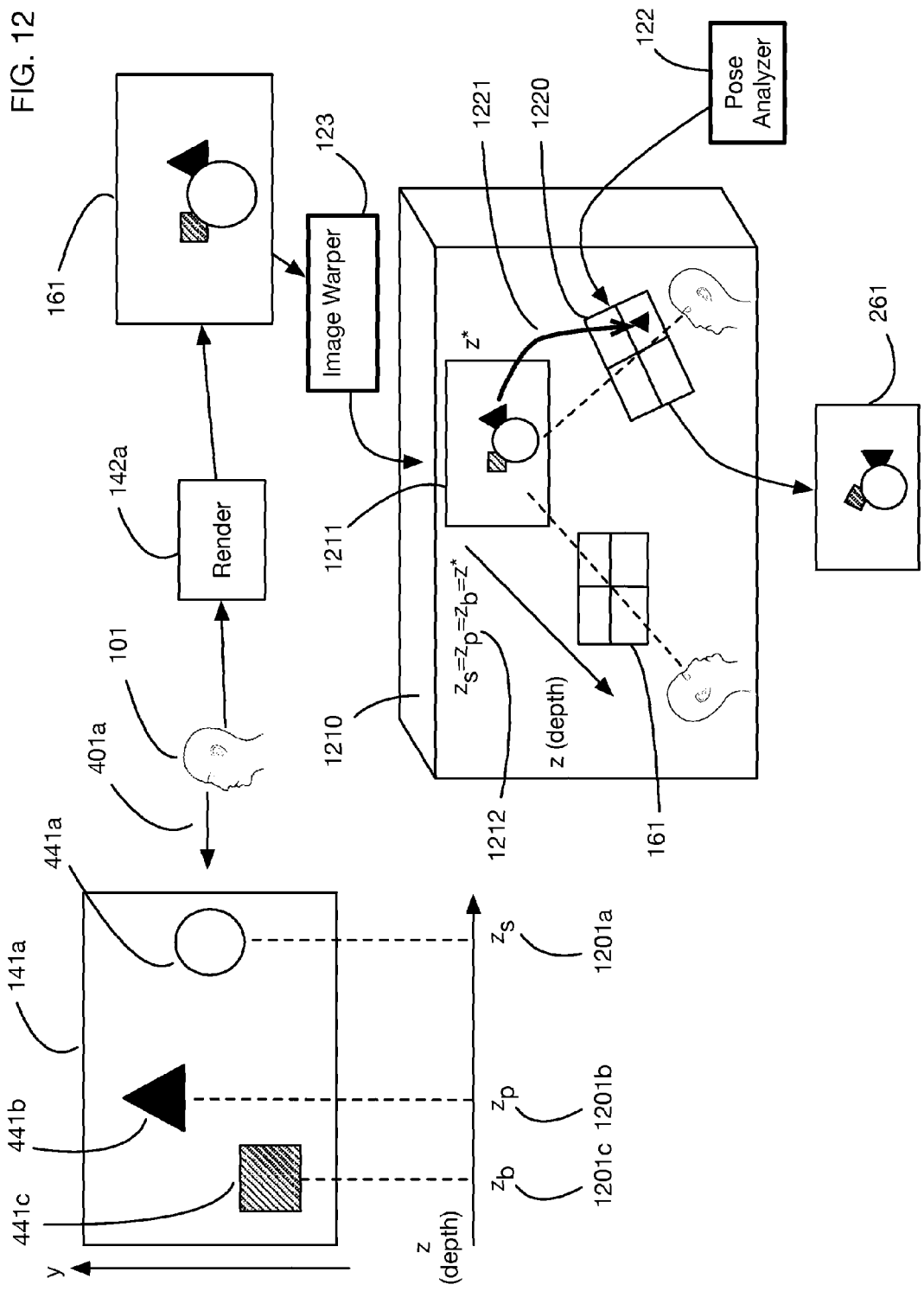
FIG. 12 illustrates an embodiment of the system that generates a low-latency rerendering transformation by projecting the rendered image onto a plane, and then rerendering onto a modified image plane corresponding the user's modified pose.

We now discuss illustrative approaches for image warping transformations. These transformations are rerendering approximations, rather than full rendering from the 3D scene model. In one or more embodiments, a rerendering approximation is generated by first creating a simplified 3D model from the 2D projections, and then reprojecting this simplified 3D model onto new view planes based on user's modified pose. For example, a simplified 3D model may be formed by mapping the 2D projections generated by the renderer onto one or more surfaces in 3D space. FIG. 12 illustrates an embodiment of the system that uses this approach for approximate rerendering. 3D scene model 141a consists of three objects: a sphere 441a close to user 101, a pyramid 441b further from the user, and a box 441c furthest from the user. FIG. 12 shows a two-dimension projection of the 3D scene model onto the y-z plane; here the z-axis points towards the user and the user is located at z=0 (a convention often used in 3D graphics applications), the y-axis points upwards, and the x-axis points towards the user's right. The sphere is at distance $z_s$ from the user; the pyramid is at distance $z_p$ from the user; and the box is at distance $z_b$ from the user. (These z-values are negative, in conformance with the orientation of the z-axis.) Scene renderer 142a generates 2D projection 161 of the 3D model. User 101 then changes pose, and image warper 123 performs a rerendering approximation to generate modified image 261. The rendering approximation first projects the 2D projection 161 onto plane 1211 in simplified 3D model 1210; this plane 1211 is at distance z* from the user. The value z* may be fixed, or it may be provided by the scene renderer 142a based on an average or typical distance of objects in the 3D model 141a from the user. In the simplified 3D model 1210 used by the image warper, all objects appear in 3D space at the same depth z* from the user, because all objects have been projected onto the single plane 1211 with depths 1212 of $z_s=z_p=z_b=z^*$. This does not match the actual depths 1201a, 1201b, and 1201c in the original 3D scene model 141a; hence the image warper is employing an approximate rerendering for efficiency, which simplifies the 3D rerendering model 1210 compared to the real 3D scene model 141a.

From the plane 1211 at depth z*, the image warper reprojects pixels onto modified view plane 1220 corresponding to the user's new pose. The orientation of plane 1220 is based on data received from pose analyzer 122. This reprojection generates modified image 261. In the illustrative example shown in FIG. 12, view plane 1220 is rotated clockwise compared to the initial view plane for image 161; hence the objects in 261 are rotated counterclockwise to form the rerendering approximation.

The embodiment illustrated in FIG. 12 generates a rerendering approximation by mapping the original 2D projection onto a single plane parallel to the user's original view plane, and then reprojecting that plane onto the user's modified view plane. One or more embodiments may map 2D projections onto other surfaces to perform approximate rerendering. For example, some embodiments may multiple portions of the 2D projections onto multiple planes. One or more embodiments may map 2D projections onto one or more curved surfaces, such as for example a sphere or a cylinder.

Mathematically, one or more embodiments may implement the rerendering approximation illustrated in FIG. 12 as follows. This implementation is illustrative only; embodiments may employ any desired transformations, algorithms, mappings, or image warpings to perform rerendering approximations. We assume for ease of illustration that a 2D projection is a rectangular image w pixels wide and h pixels high, and that the width w represents a horizontal field of view of f radians. We assume that the 2D projection was generated using a perspective projection transform of the 3D scene model onto view plane z=−1, followed by a scaling from spatial coordinates to pixel coordinates of s=w/2 tan f/2. The view plane z=−1 is mapped onto plane z=−z* to form the 3D model for rerendering; thus point (x,y) of the view plane is mapped to coordinates (z*x,z*y,−z*). The subsequent change to the user's pose is modeled as a rigid body transformation T of the view plane, which in general consists of a rotation R of angle $\Delta\theta$ around unit vector axis $\hat{\omega}$ followed by a translation by vector $\Delta r$. Each point (z*x, z*y,−z*) is then projected onto this new view plane, and rescaled from spatial coordinates to pixel coordinates by the same scaling factor of s=w/2 tan f/2, to generate the rerendering approximation.

Derivation of the projection onto the new view plane may be simplified by recognizing that transforming the view plane by transformation T is equivalent to transforming the points on the plane z=−z* by $T^{-1}$, and then mapping these points to the original view plane z=−1. Mapping points to the view plane z=−1 is straightforward: point (x,y,z) maps to $$\left(-\frac{x}{z}, -\frac{y}{z}, -1\right).$$

Thus the rerendering approximation includes the following steps:

$$(x, y) \to (z^*x, z^*y, -z^*) =$$
$$(x_0, y_0, z_0) \to T^{-1}(x_0, y_0, z_0) = (x_1, y_1, z_1) \to \left(-\frac{x_1}{z_1}, -\frac{y_1}{z_1}\right) = (x', y')$$

Mapping $T^{-1}$ consists of a translation by vector $-\Delta r$ followed by a rotation R of angle $-\Delta\theta$ around unit vector axis $\hat{\omega}$. We now consider the case of small changes in the user's pose, where both $\Delta r$ and $\Delta\theta$ are small. In this case, rotation R can be approximated as $R \approx I+S(\hat{\omega})\Delta\theta$, where S is the cross-product matrix ($S(u)v=u\times v$), and I is the identity matrix. For small changes, the effects of translation and rotation are approximately additive; thus $T^{-1}r \approx r-\Delta r-(\hat{\omega}\times r)\Delta\theta$. Letting $\Delta r=(\Delta r_x, \Delta r_y, \Delta r_z)$ and $\hat{\omega}=(\omega_x,\omega_y,\omega_z)$ we have $T^{-1}(x_0,y_0,z_0)=(x_0-\Delta r_x-\omega_y z_0\Delta\theta+\omega_z y_0\Delta\theta, \ y_0-\Delta r_y+\omega_x z_0\Delta\theta-\omega_z x_0\Delta\theta, \ z_0-\Delta r_z-\omega_x y_0\Delta\theta+w_y x_0\Delta\theta)$. Thus $$x' = -\frac{x_0 - \Delta r_x - \omega_y z_0\Delta\theta + \omega_z y_0\Delta\theta}{z_0 - \Delta r_z - \omega_x y_0\Delta\theta + \omega_y x_0\Delta\theta} =$$

$$-\frac{z^*x - \Delta r_x + \omega_y z^*\Delta\theta + \omega_z z^*y\Delta\theta}{-z^* - \Delta r_z - \omega_x z^*y\Delta\theta + \omega_y z^*x\Delta\theta} = \frac{x - \frac{\Delta r_x}{z^*} + \omega_y\Delta\theta + \omega_z y\Delta\theta}{1 + \frac{\Delta r_z}{z^*} + \omega_x y\Delta\theta - \omega_y x\Delta\theta}$$

and $$y' = -\frac{y_0 - \Delta r_y + \omega_x z_0\Delta\theta + \omega_z x_0\Delta\theta}{z_0 - \Delta r_z - \omega_x y_0\Delta\theta + \omega_y x_0\Delta\theta} =$$

$$-\frac{z^*y - \Delta r_y - \omega_x z^*\Delta\theta - \omega_z z^*x\Delta\theta}{-z^* - \Delta r_z - \omega_x z^*y\Delta\theta + \omega_y z^*x\Delta\theta} = \frac{y - \frac{\Delta r_y}{z^*} - \omega_x\Delta\theta - \omega_z x\Delta\theta}{1 + \frac{\Delta r_z}{z^*} + \omega_x y\Delta\theta - \omega_y x\Delta\theta}$$

These expressions can be further simplified for the case of small x and y, which corresponds to pixels relatively near the center of the original 2D projection. Continuing to assume that both Δr and Δθ are small, many of the terms above are second-order expressions, such as for example yΔθ. Ignoring these second order terms, we have approximately:

$$x' \approx \frac{x - \frac{\Delta r_x}{z^*} + \omega_y \Delta\theta}{1 + \frac{\Delta r_z}{z^*}}$$

$$y' \approx \frac{y - \frac{\Delta r_y}{z^*} - \omega_x \Delta\theta}{1 + \frac{\Delta r_z}{z^*}}$$

Furthermore for small Δr the denominator can be ignored to first order, since $$\frac{1}{1 + \Delta r_z/z^*} \approx 1 - \Delta r_z/z^*,$$

and the product of $\Delta r_z/z^*$ with the terms in the numerators consists of second order terms. Thus we can use the rerendering approximation:

$$x' \approx x - \frac{\Delta r_x}{z^*} + \omega_y \Delta\theta$$

$$y' \approx y - \frac{\Delta r_y}{z^*} - \omega_x \Delta\theta$$

Using this approximation, all coordinates (x,y) are therefore shifted uniformly by translation $$(\Delta x, \Delta y) = \left(-\frac{\Delta r_x}{z^*} + \omega_y \Delta\theta, -\frac{\Delta r_y}{z^*} - \omega_x \Delta\theta\right).$$

This formula provides the coordinate translation in spatial coordinates of the simplified 3D model. To convert to pixel coordinates, we simply apply the scaling factor s=w/2 tan f/2. This yields the pixel translation vector (sΔx,sΔy).

This derivation shows that an approximate rerendering can be performed using a simple pixel translation vector which is based on a simplified 3D model, and which is a good approximation for small pose changes and for pixels near the center of a display. The derivation shown considers both rotational pose changes and translational pose changes. One or more embodiments may consider only rotational pose changes. These embodiments may for example use a pixel translation vector of (sΔx,sΔy)=(sω_y Δθ,−sω_x Δθ), which uses only the rotational components of the pixel translation vector. One or more embodiments may consider only translational pose changes. These embodiments may for example use a pixel translation vector $$(s\Delta x, s\Delta y) = \left(-\frac{s\Delta r_x}{z^*}, -\frac{s\Delta r_y}{z^*}\right),$$

of which uses only the translational components of the pixel translation vector. One or more embodiments may consider both rotational pose changes and translational pose changes. These embodiments may for example use the complete pixel translation vector derived above of $$(s\Delta x, s\Delta y) = \left(-\frac{s\Delta r_x}{z^*} + s\omega_y \Delta\theta, -s\omega_x \Delta\theta - \frac{s\Delta r_y}{z^*}\right).$$

The pixel translation vector approximation derived above is only one of many possible approximations to rerendering. One or more embodiments may use other approximations, or use the exact expressions derived above, to perform rerendering approximations.

Figure 13:
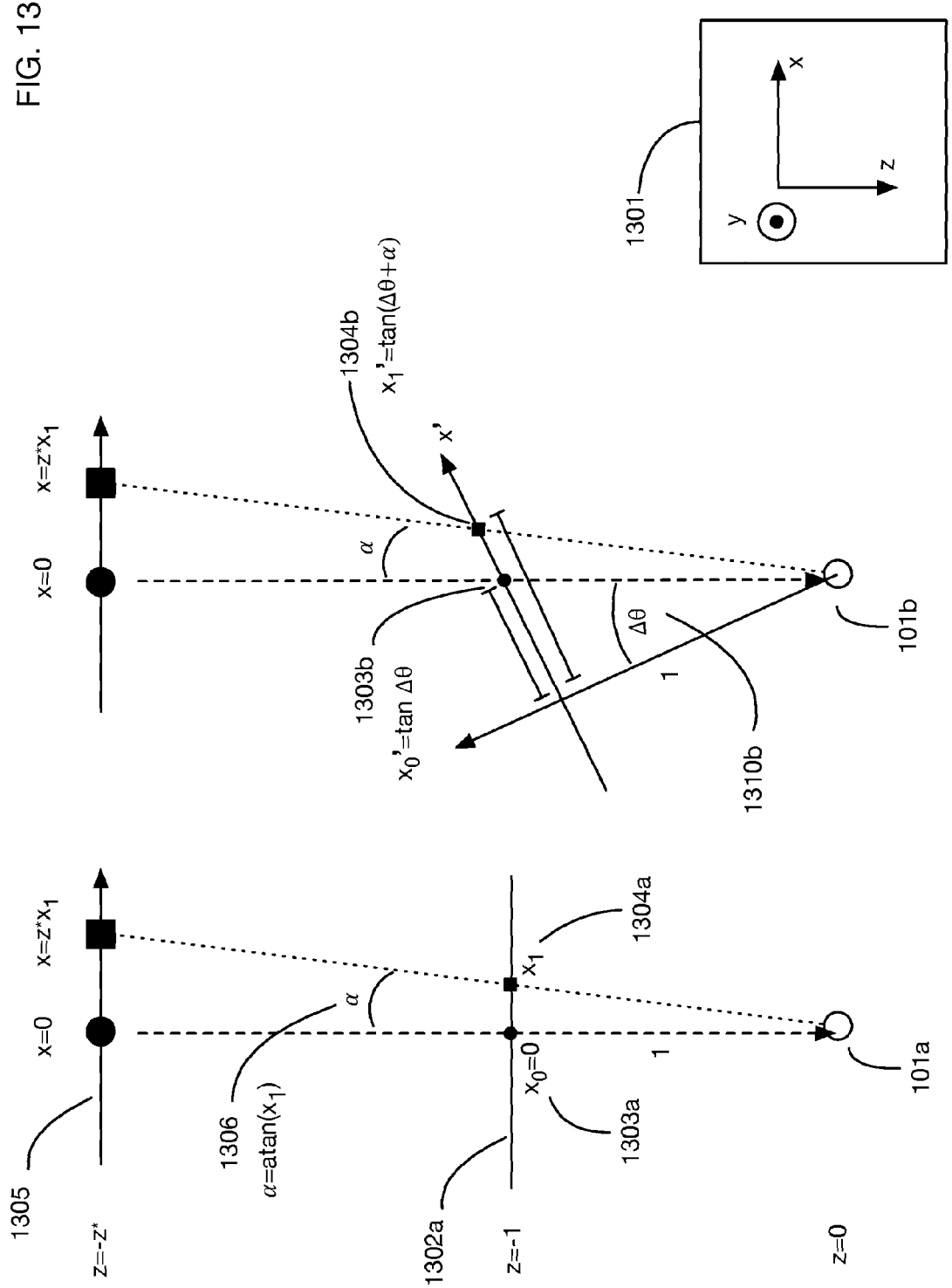
FIG. 13 shows a 2D model of an approximate rerendering calculation that generates a pixel translation vector from small angular rotations of a user's orientation.
Figure 14:
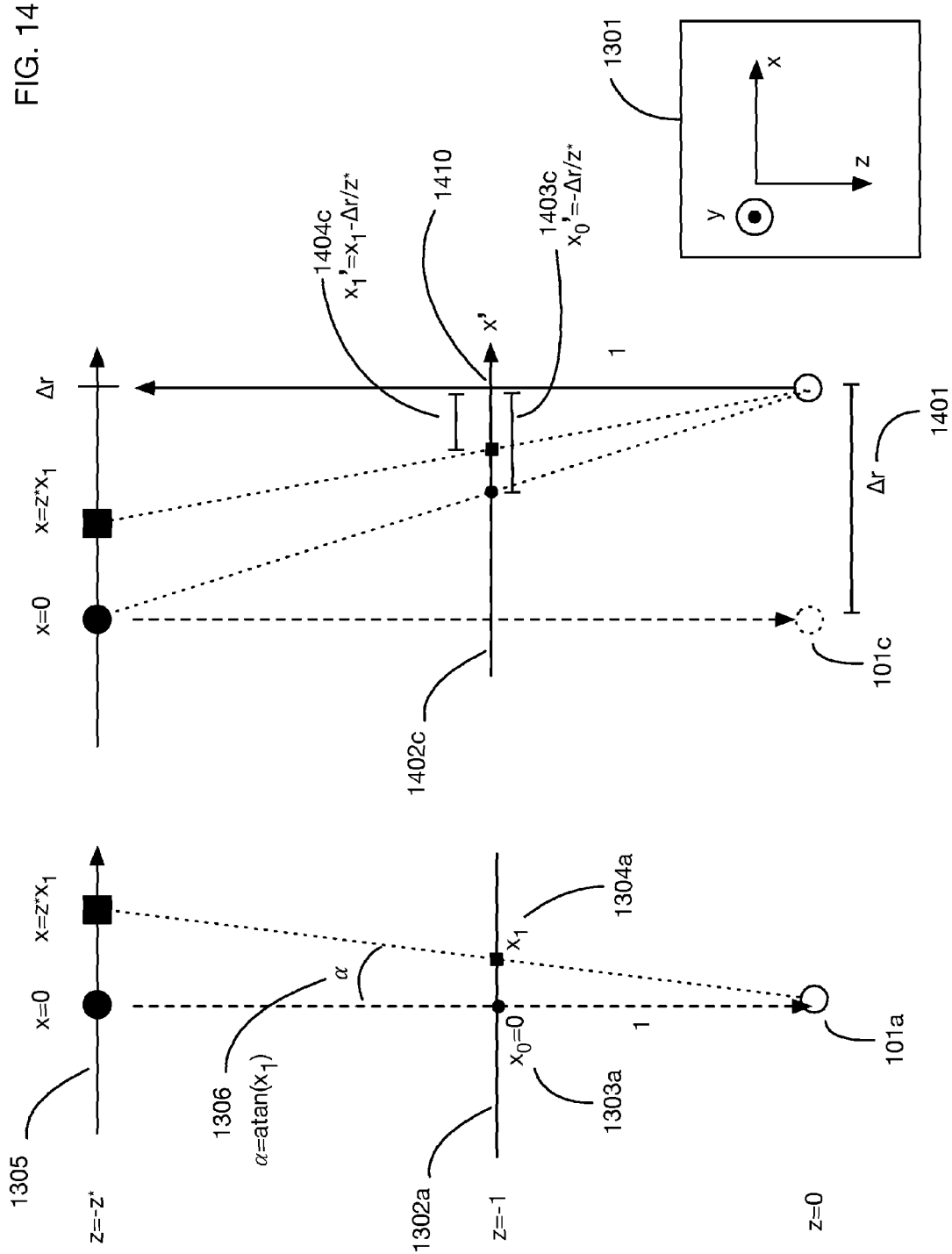
FIG. 14 shows a 2D model of an approximate rerendering calculation that generates a pixel translation vector from translations of a user's position.

Rerendering approximations using the above derived pixel translation vector are illustrated in FIGS. 13 and 14. FIG. 13 illustrates an example of a pose change consisting of a small angular rotation around the y axis. FIG. 13 shows a top view of the transformations, with the coordinate system 1301; the y axis points out of the page. Initially the user has pose 101a, and the 2D projection generated from the 3D scene model has a circle at x-coordinate 1303a (which is 0 since it is at the center of the display), and a square at x coordinate 1304a, which is at angle 1306 (α). The rerendering approximation first maps these objects from the view plane 1302a onto plane 1305, located at distance z* from the user. The user then changes pose to 101b, by rotating the view vector clockwise around the y axis by angle Δθ. The objects on plane 1305 are then reprojected on the new view plane. The circle, which was originally at $x_0$=0, has new x coordinate 1303b in the new view plane, with value $x_0$'=tan Δθ. Since we presume that Δθ is small, tan Δθ≈Δθ. The square which was originally at $x_1$ has new x coordinate 1304b in the new view plane, with value $x_1$'=tan(Δθ+α). If both Δθ and α are small, then tan(Δθ+α)≈tan Δθ+tan α≈Δθ+$x_1$. Thus both points $x_0$ and $x_1$ are shifted approximately by amount Δθ. This result corresponds to the pixel translation vector formula derived above, with $\omega_y$=1, $\omega_x$=Δ$r_x$=Δ$r_y$=0.

FIG. 14 illustrates an example of a pose change consisting of a small translation along the x-axis by amount Δr. The initial user pose 101a, 2D projection 1302a, and mapping to plane 1305 are identical to those of FIG. 13. The user then changes pose to 101c, by moving to the right by amount 1401 (Δr). The view plane also moves to the right, the origin of the new x' axis 1402c perpendicular to the user's new position at point 1410. Objects on plane 1305 are then reprojected on the new view plane. The circle, which was originally at $x_0$=0, has new x coordinate 1403c in the new view plane, with value $x_0$'=−Δr/z*. The square which was originally at $x_1$ has new x coordinate 1404c in the new view plane, with value $x_1$'=$x_1$−Δr/z*. This result corresponds to the pixel translation vector formula derived above, with Δ$r_x$=Δr, $\omega_x$=$\omega_y$=Δ$r^y$=0.

Figure 15:
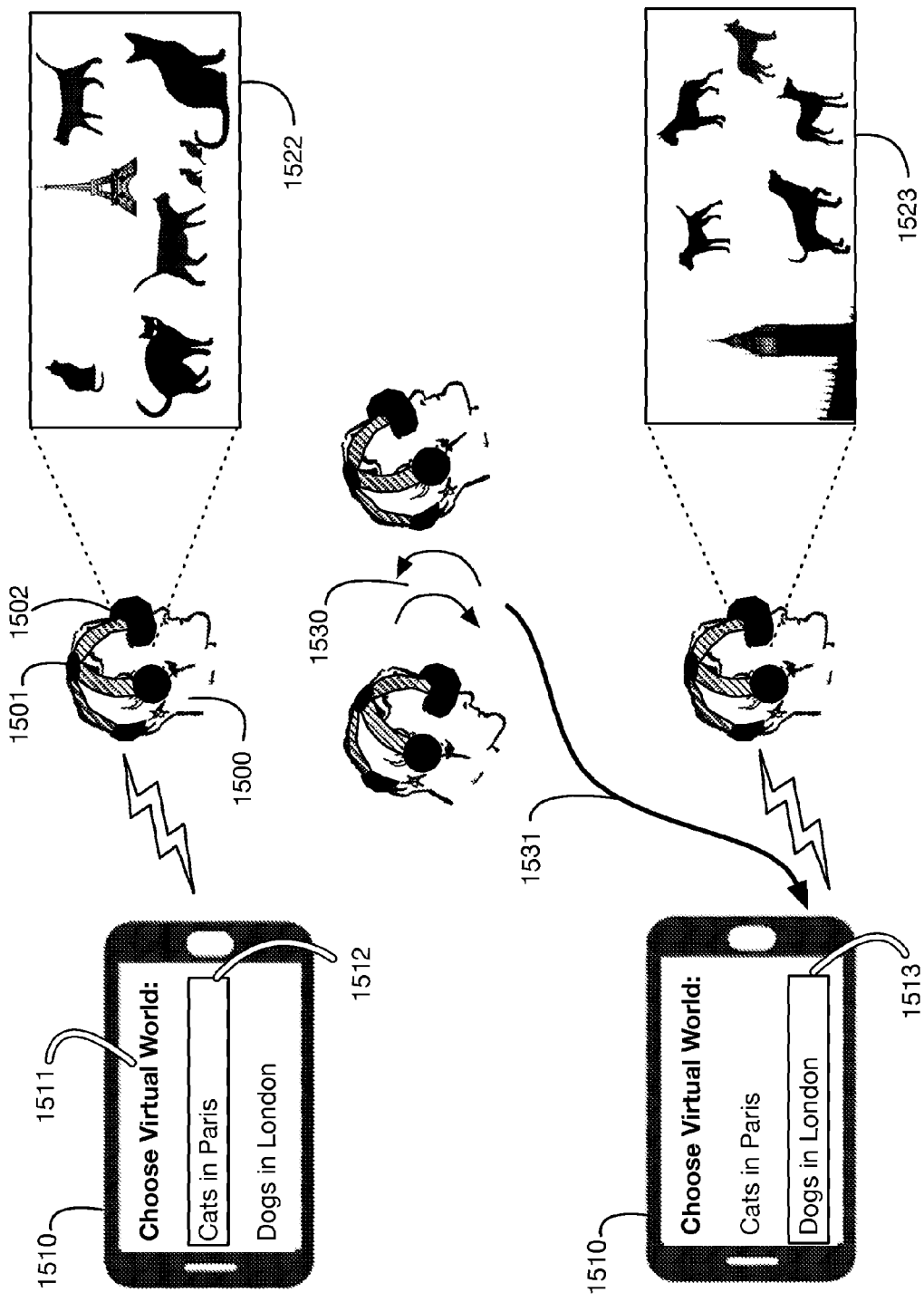
FIG. 15 illustrates an embodiment of the system that recognizes specific head gestures as control commands; in this example the user makes a head gesture to switch from one virtual world to another.

One or more embodiments of the system may recognize selected motions, orientations, or positions of the user as control command gestures. The control commands associated with gestures may for example modify characteristics of the virtual world observed by the user. FIG. 15 illustrates an embodiment with a head gesture to modify the virtual world. User 1500 wears a virtual reality headset 1501 that includes display or displays 1502. For illustration, headset 1501 includes displays, one or more sensors, and possibly headphones. This configuration is illustrative; one or more embodiments may use any configuration and location of components and devices, and may for example include displays, speakers, or sensors that are not attached to a user's body. As described for the embodiment of FIG. 1, in the embodiment of FIG. 15 some components of the system may be located in a mobile device. For example, mobile device 1510 may include a 3D model of a virtual world, as well as rendering modules that generate images of the virtual world for the displays 1502. In the embodiment of FIG. 15, the headset 1501 and the mobile device 1510 communicate wirelessly. In one or more embodiments a headset and any other devices may communicate over any wired or wireless networks. User 1500 is initially observing scene 1522. This scene may for example be generated by mobile device 1510 and transmitted wirelessly to headset 1501. In this illustrative example, mobile device 1510 contains 3D models for two different virtual worlds, and the user may view either of them. The illustrative app screen 1511 provides an input control for the user to select which virtual world he or she wishes to observe. However, because the user is wearing the virtual reality headset 1501, he or she cannot view the app screen 1511. Therefore, the embodiment provides gesture-based commands so that the user can control the virtual reality display without seeing the user interface controls on the mobile device. In the example shown in FIG. 15, user 1500 executes illustrative head gesture 1530, which is a nod of the head downward and then upward. This gesture is transmitted 1531 to the mobile device 1510, which interprets it as a command to switch the virtual world from 1512 to 1513. The user then sees the display 1523 of the selected virtual world. This gesture 1530 is illustrative; one or more embodiments may use any gesture of any body part to execute any control command.

Figure 16:
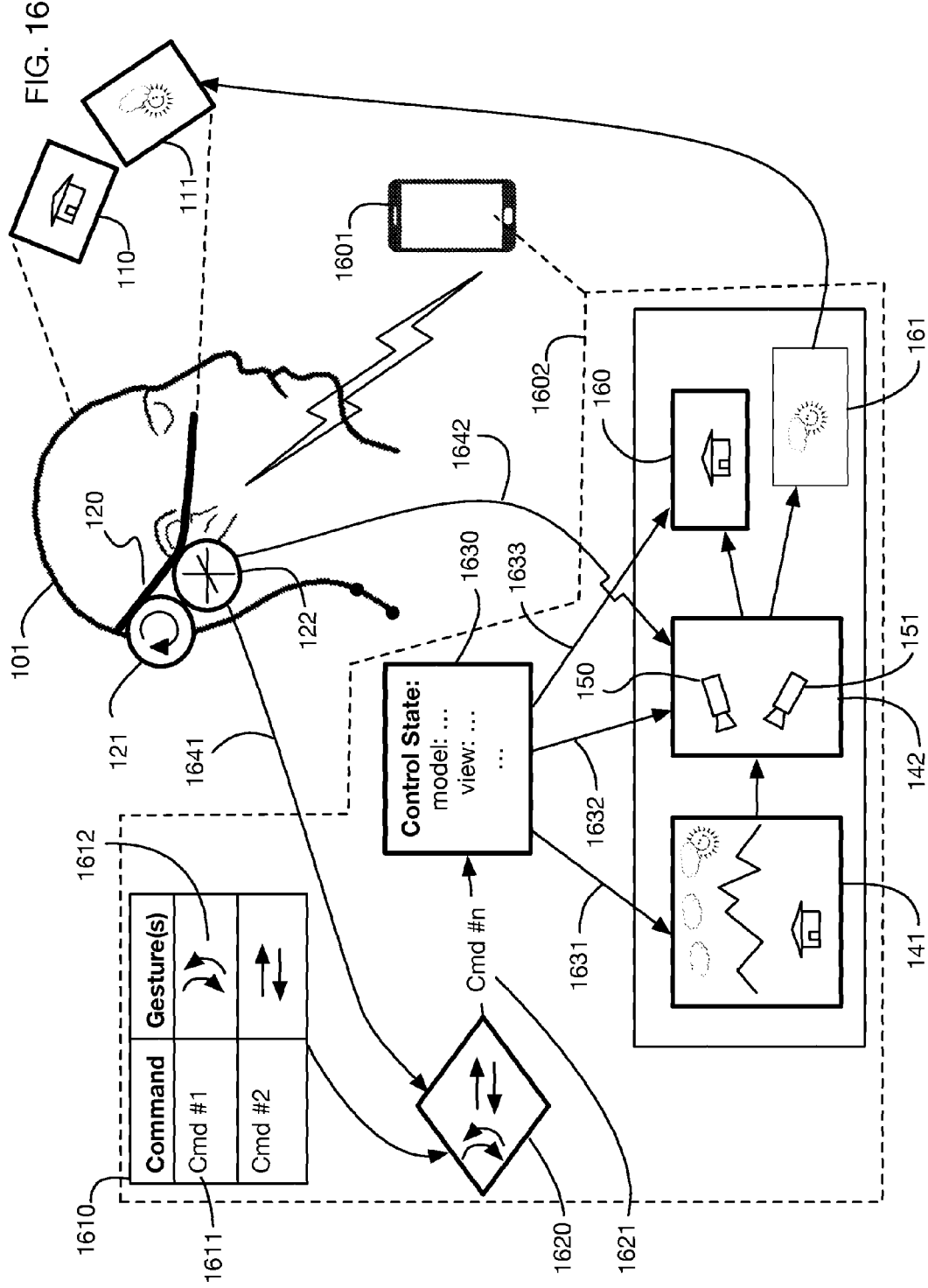
FIG. 16 shows a block diagram of an embodiment that includes a gesture recognizer that detects command gestures, and updates a control state based on the recognized command.

FIG. 16 illustrates a block diagram of an embodiment of the system that supports control command gestures. User 101 wears virtual reality headset 120, which includes sensor or sensors 121 that measure one or more aspects of the pose of a body part of the user. In FIG. 16 the sensor(s) 121 measure for example the orientation of the head of user 101. Virtual reality headset 120 also includes pose analyzer 122, which uses data from sensor(s) 121 to calculate the pose of one or more body parts of user 101. The headset has displays 110 and 111 viewable by the user. One or more embodiments may include any number of displays, which may be located on a virtual reality headset or may be for example stationary and viewable by a user.

In the embodiment of FIG. 16, components on the headset 120 communicate wirelessly with mobile device 1601. In this illustrative configuration, mobile device 1601 hosts several components 1602 of the system. In one or more embodiments, components of the system may be hosted on any devices, computers, mobile devices, servers, or microprocessors, including combinations of these elements that communicate over wired or wireless connections or networks. As described for the embodiment illustrated in FIG. 1, the system includes a 3D model 141 of a virtual environment, and a scene renderer 142 that generates 2D projections 160 and 161 of the model 141 using virtual cameras 150 and 151; these 2D projections are transmitted to displays 110 and 111. To support gesture-based commands, the system also includes control command definitions 1610. Each definition includes a command 1611 and an associated gesture or gestures 1612. In one or more embodiments control commands can define any action or input that modifies the system or queries the system in any manner. One or more gestures may be associated with each command. Gestures may be associated with any body part of a user, or with multiple body parts. In one or more embodiments gestures may include compound gestures such as gestures that involve multiple body parts.

The embodiment of FIG. 16 includes a gesture recognizer 1620. This subsystem receives information about the motion, position, or orientation of one or more body parts of the user 101, and it determines whether the user has executed one or more gestures such as those defined in table 1610. For example, the gesture recognizer 1620 may receive pose data from pose analyzer 122, which may for example be on a device worn by a user. The gesture recognizer may also access the table 1610 of commands and associated gestures in order to compare user motions to the defined gestures. FIG. 16 illustrates the gesture recognizer 1620 recognizing a gesture associated with command 1621. The system then uses this command 1621 to modify or query the state of the system. For example, one or more embodiments may include a control state 1630 that controls various aspects of the system behavior. Any command may modify or query this control state in any desired manner. The control state may be structured in any manner. For example, it may include tables or lists of variables, or of more complex data structures. It may include for example one or more databases. It may include variables with values of any data type. It may be a combination of multiple subsidiary control states.

The control state 1630 of the system may affect the virtual reality display in multiple possible ways. For example, in one or more embodiments the control state may directly select or modify 1631 the 3D model 141 of the virtual environment. In one or more embodiments the control state may affect 1632 the virtual cameras 150, 151 used to render 2D projections of the scene; for example, the control state may alter the position or orientation of the virtual cameras. The control state may also affect 1633 the 2D projections such as 160 and 161; for example, based on the control state, selected text or graphics may be overlaid onto the 2D projections. Any behavior or appearance of the system may depend on the control state, and hence may be modified using control command gestures.

Figure 17:
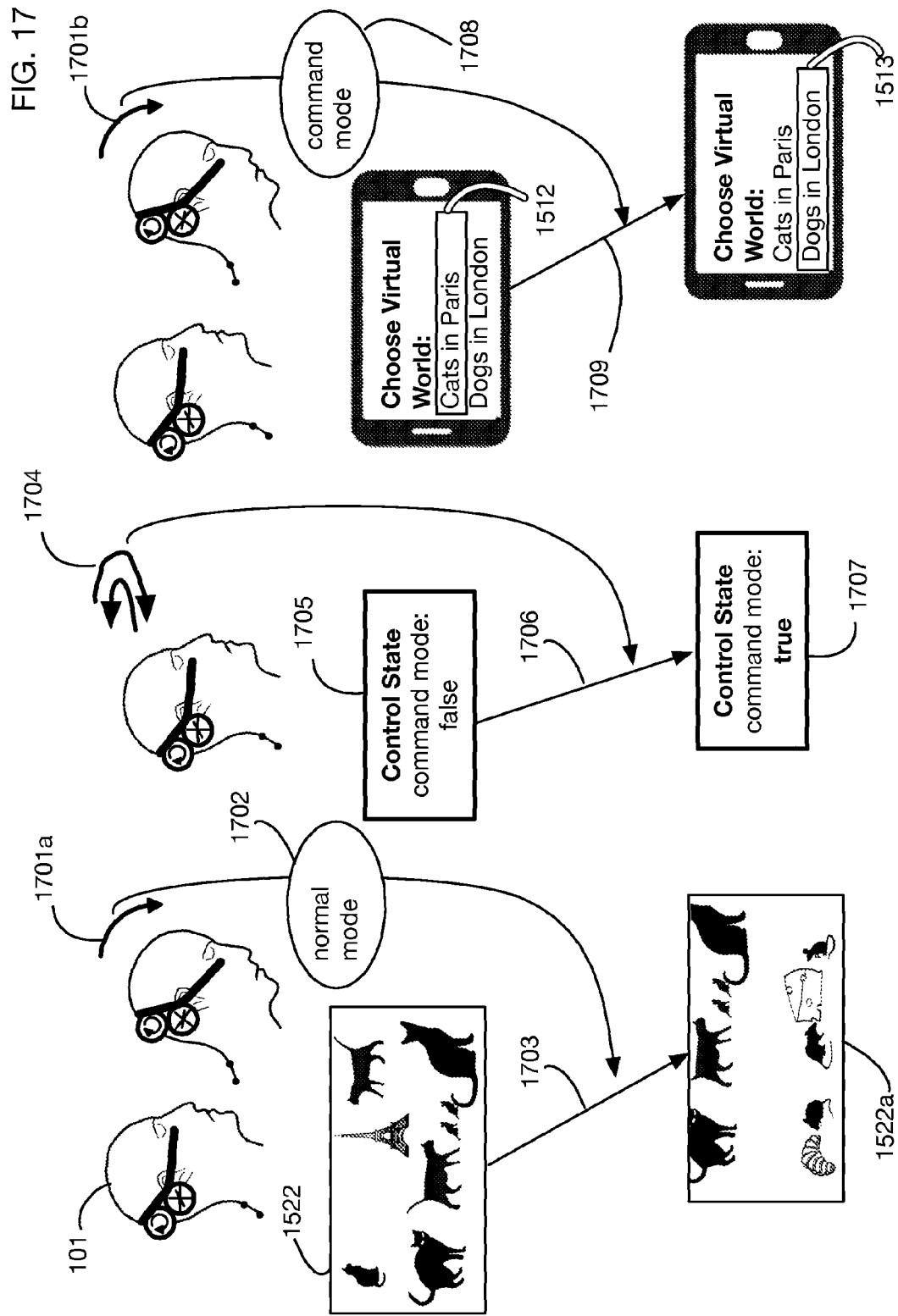
FIG. 17 illustrates an embodiment that recognizes a specific gesture to place the system into a command mode, which affects how other gestures are interpreted by the system.

In one or more embodiments one or more gestures may be interpreted as control commands only if the system is in a designated command mode. FIG. 17 illustrates an embodiment with a command mode. Initially the system is in "normal" (non-command) mode 1702. User 101 rotates his head downward with motion 1701a. This motion is not interpreted as a command gesture, because the system is not in command mode. Instead the user's view 1522 of the virtual world is modified 1703 with a new viewpoint corresponding to the rotated orientation of the user's head, yielding new image 1522a that corresponds to the user looking downward at the virtual world. The user then makes a special gesture 1704 to put the system into command mode. The illustrative gesture 1704 is rotation of the head left, then right. This gesture to enable command mode is an illustrative example; one or more embodiments may use any gesture or gestures to enable or disable a command mode. In the embodiment of FIG. 17, command mode is determined by a flag in control state 1705. Initially control state 1705 has command mode set to false. The gesture 1704 is recognized as a command to enable command mode, which makes modification 1706 to the control state, yielding modified control state 1707 with command mode set to true. The user's subsequent movement 1701b of rotating his head downward is now interpreted as a command gesture, because the system is in command mode 1708. In this illustrative example the rotate head downward gesture is associated with a command to toggle or otherwise update the 3D model of the virtual world that the user wishes to view. Thus execution of this command 1709 modifies the selected virtual world 1512 and selects the new virtual world 1513. In one or more embodiments one or more gestures may be associated with exiting command mode. In one or more embodiments a gesture to enter command mode may be used as well to exit command mode. In one or more embodiments the system may automatically exit command mode after a period of time, or after a subsequent command is recognized and executed.

Figure 18:
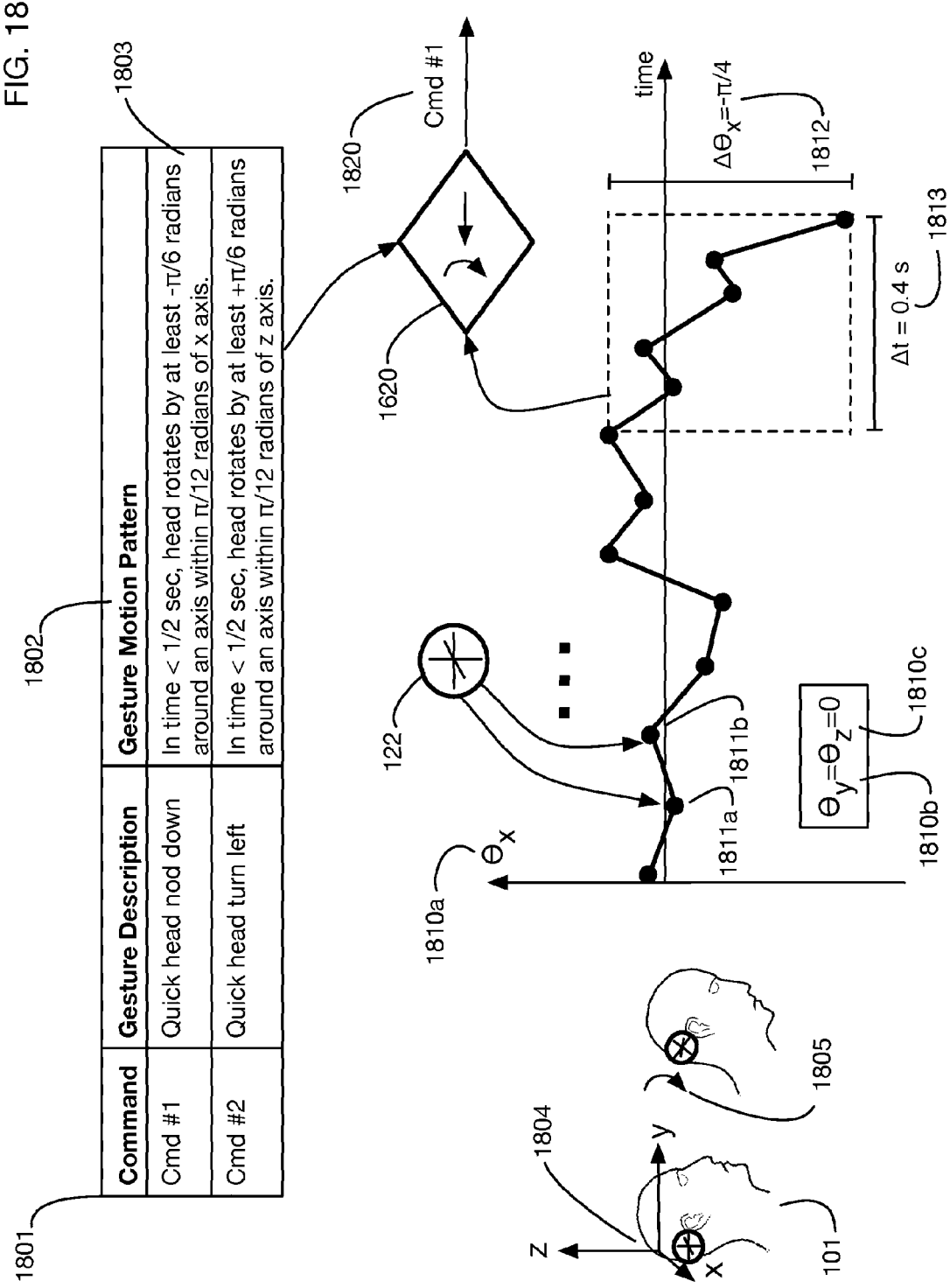
FIG. 18 shows an illustrative gesture recognizer that uses a motion pattern definition for each gesture.

A gesture recognizer may use any method or methods to determine if a motion, orientation, or position of any body part or combination of body parts represents a gesture associated with a control command. FIG. 18 illustrates an embodiment in which the gesture recognizer compares measured motions with gesture motion patterns defined for one or more control commands. Table 1801, which is accessible to the gesture recognizer 1620, defines a gesture motion pattern 1802 for one or more commands. For example, gesture motion pattern 1803 defines specific criteria for a "quick head nod down" gesture. For illustration these criteria are defined with respect to coordinate axes 1804. One or more embodiments may use any languages or data structures to define gesture motion patterns. The gesture recognizer receives pose data from pose analyzer 122. In some cases, an individual pose data sample may be sufficient to determine if a gesture has occurred; for example, a gesture may be defined by a particular orientation of a body part. However, in other cases gesture recognition requires tracking changes in pose over time. The gesture recognizer may therefore accumulate a time series of pose data, and compare this time series or portions thereof to one or more gesture motion patterns. In the illustrative example of FIG. 18, user 101 makes motion 1805, which results in pose analyzer 122 sending a series of pose data samples to the gesture recognizer. This example illustrates orientation pose data that comprises Euler angles around the axes 1804. This pose data format is illustrative; one or more embodiments may use any representation or representations for any aspect of the pose of any body part. The example presumes that the head of user 101 rotates only around the x-axis for ease of illustration; thus the Euler angles 1810*b* and 1810*c* for rotation around the y and z axes are presumed to be zero. The gesture recognizer 1620 accumulates a time series of angular rotations 1810*a* around the x-axis, such as for example sample points 1811*a* and 1811*b*. It compares this time series to the gesture motion patterns 1802. In this example, the angular change 1812 over time interval 1813 matches the criteria 1803 for Cmd #1; thus the gesture recognizer detects this command 1820.

Figure 19:
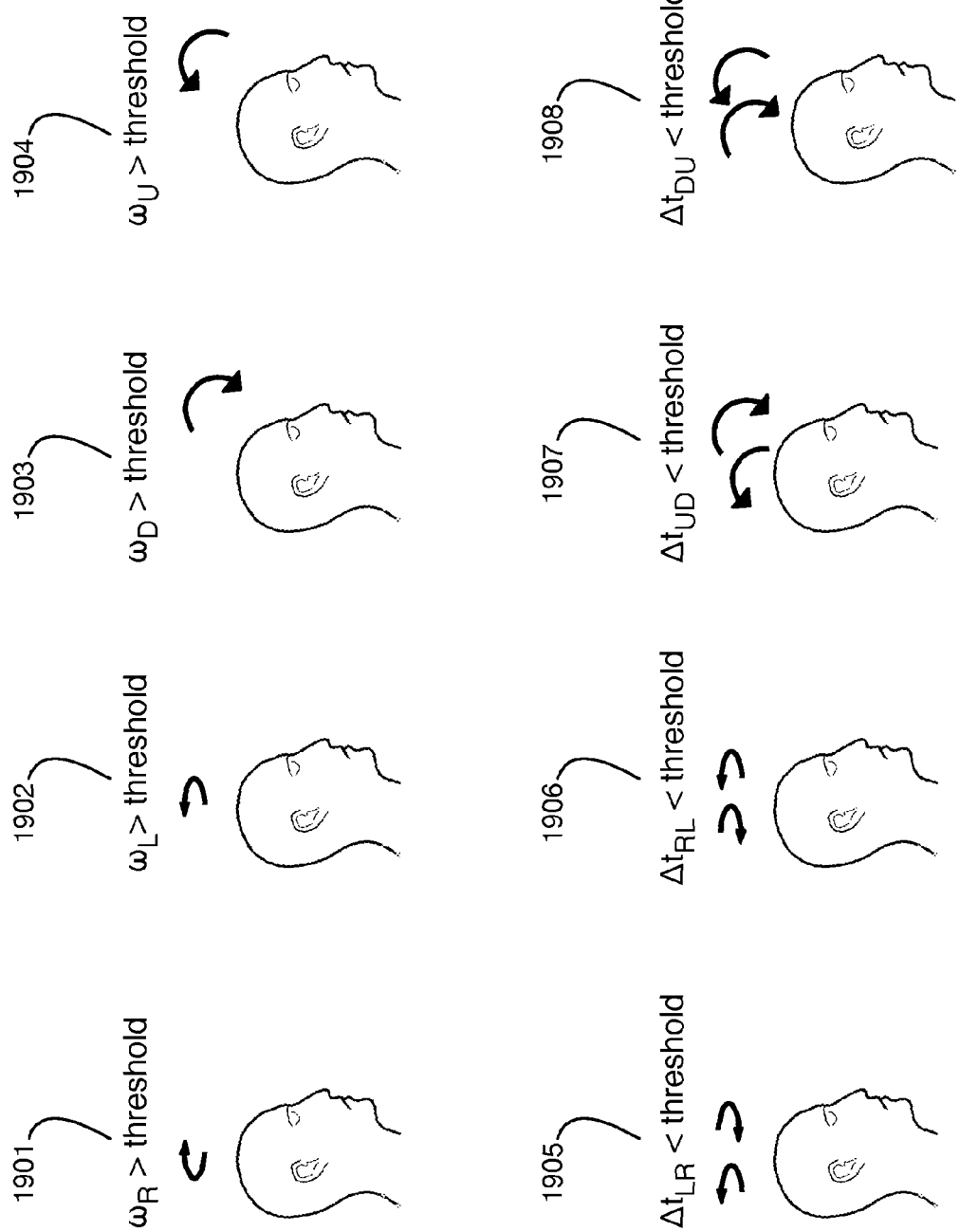
FIG. 19 shows illustrative head gestures for an embodiment of the system.

One or more embodiments may use any motion, orientation, or position of any body part as a gesture for a control command. FIG. 19 shows some illustrative head gestures that may be associated with control commands in one or more embodiments. 1901 is a head turn to the right with an angular velocity $\omega_R$ that exceeds a threshold value. 1902 is a head turn to the left with an angular velocity $\omega_L$ that exceeds a threshold value. 1903 is a head nod downward with an angular velocity $\omega_D$ that exceeds a threshold value. 1904 is a head nod upward with an angular velocity $\omega_U$ that exceeds a threshold value. 1905 is a head turn left, followed by a head turn right, with the motion occurring over a time interval $\Delta t_{LR}$ that is less than a threshold value. 1906 is a head turn right, followed by a head turn left, with the motion occurring over a time interval $\Delta t_{RL}$ that is less than a threshold value. 1907 is a head nod up, followed by a head nod down, with the motion occurring over a time interval $\Delta t_{UD}$ that is less than a threshold value. 1908 is a head nod down, followed by a head nod up, with the motion occurring over a time interval $\Delta t_{DU}$ that is less than a threshold value. These gestures and their definitions are illustrative examples. One or more embodiments may use any desired gestures, with any criteria for specifying when a gesture has occurred.

Figure 20:
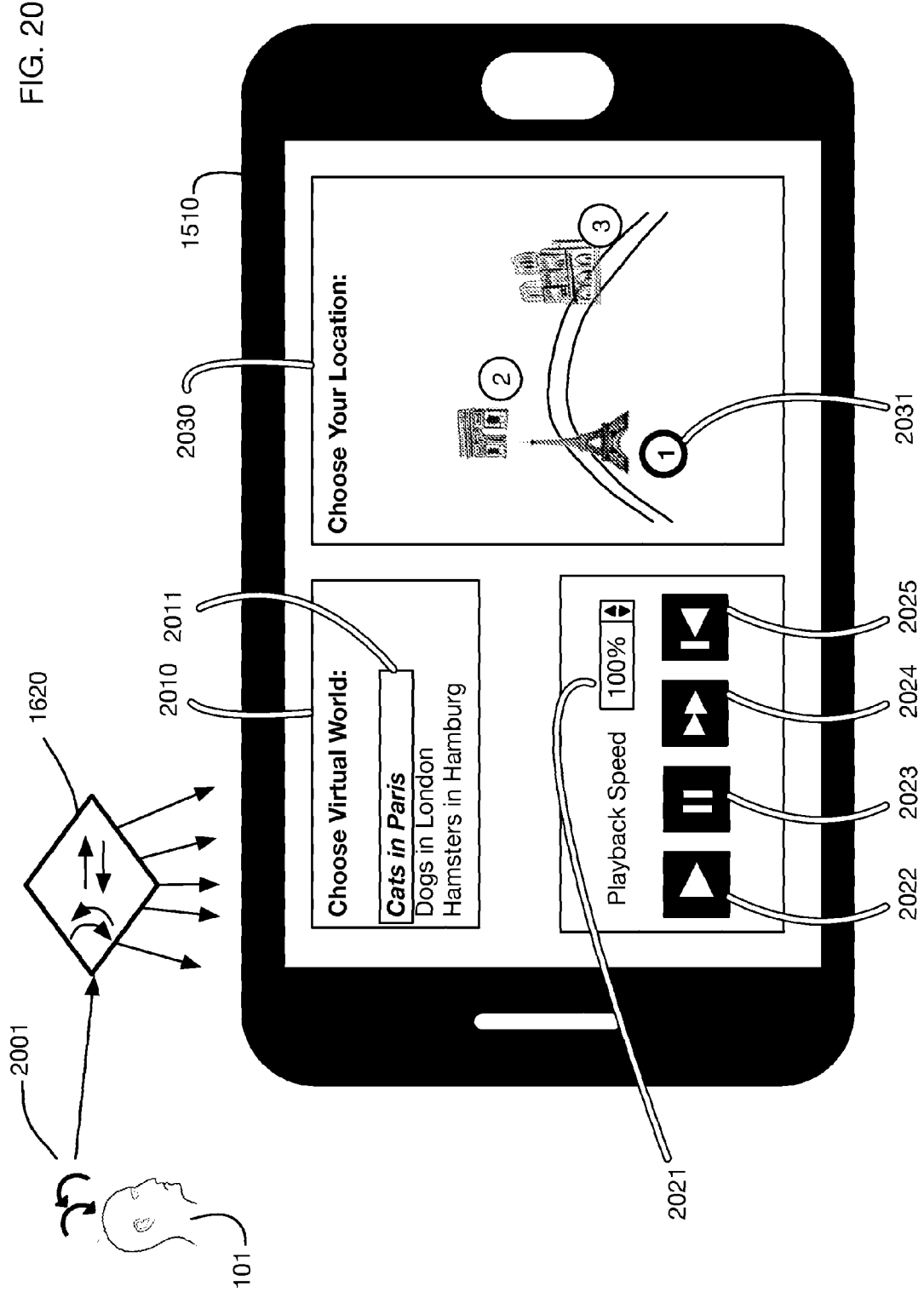
FIG. 20 shows illustrative control commands that may be associated with gestures in an embodiment of the system.

One or more embodiments may associate gestures with any desired control commands that affect or query any aspect of the system. FIG. 20 illustrates some illustrative control commands that may be associated with gestures in one or more embodiments. The control commands are illustrated on an app screen on a mobile device 1510. However, the user 101 may execute some or all of these commands using gestures instead of interacting directly with the app. For example, gesture 2001 is processed by gesture recognizer 1620, which then programmatically accesses the appropriate command or commands in the app on the mobile device 1510. Any gesture may be associated with any command. In one or more embodiments the association of gestures with commands may be configurable by the user or for example by an administrator. As discussed previously, gestures may be associated with a control 2010 that allows the user to select a virtual world, such as virtual world 2011. Gestures may also be associated with one or more commands that affect how the selected virtual world is displayed to the user. For example, one or more virtual worlds may be dynamic, with a playback or animation sequence that may be predetermined or that may depend on user actions. The user may be able for example to use gesture-based commands to control the animation or playback of the virtual world. For example, command 2021 may affect the speed of playback. Command 2022 may start playback; command 2023 may pause or stop playback; command 2024 may fast-forward playback; and command 2025 may rewind playback. These commands are illustrative; one or more embodiments may support any gesture-based commands to modify the time evolution of the virtual world in any desired manner. One or more embodiments may also support commands that modify the viewpoint of the user in the virtual environment. For example, in an embodiment with only orientation sensors for the user's head (or other body parts), the location of the user in the virtual world may need to be modified using commands. Control 2030 illustrates commands to select the user's location in the virtual environment; for example, location 2031 may be selected with a specific gesture for that location.

In one or more embodiments, gestures may be used to provide user input, for example to select from a set of menu items or to select a value of an input control. FIG. 21 illustrates an embodiment that presents a menu in response to a gesture, and then uses subsequent gestures to obtain the user's selection from the menu. This example is illustrative; one or more embodiments may use any gesture or combination of gestures to display any input control or to obtain any type of user input. User 1500 is observing virtual world 1522. Initially the system control state indicates that user input is not expected. The user makes a gesture 2101 that initiates user input; this sets the user-input-in-progress flag of the control state to true 2102. This flag causes a menu 2103 to be drawn on the user's display screen. The user may then use gestures to select from the menu. For example, when the user looks down 2104, the focus of the menu changes to item 2105. By looking at this item, the user indicates that this is the desired selection. The image rendered from the 3D environment does not necessarily change when the user looks down, because the system is in user input mode. (In one or more embodiments head motion for example may result in both changes to the rendered images and changes to user selections from user input controls.) In more complex menus or other input controls the user selection may depend on other factors in addition to or instead of the direction of the user's view. In this illustrative embodiment, if the user maintains his view orientation for a sufficient time period 2016, the selection is made and the virtual world switches to display 1523 corresponding to the user's selection. In one or more embodiments a specific gesture may be used to complete user input. In one or more embodiments the user may be able to cancel pending user input with a specific gesture. In one or more embodiments a user input control may completely replace the virtual world display rather than appearing as an overlay on the screen. Any method of using gestures to initiate user input and to collect user input is in keeping with the spirit of the invention.

Figure 22:
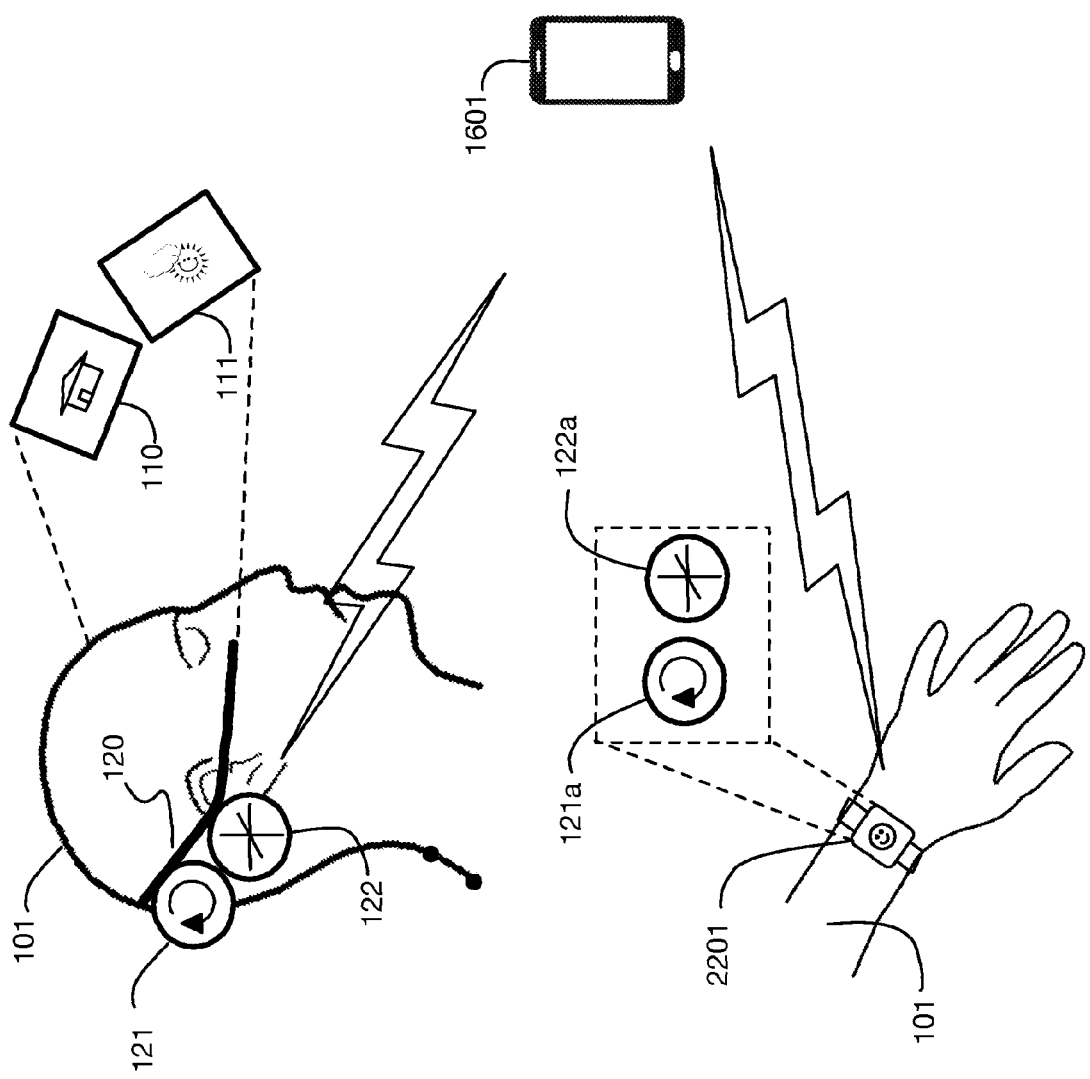
FIG. 22 illustrates an embodiment of the system with sensors on a user's head and on a user's wrist; in this embodiment control command gestures may be associated with head movements or wrist movements or both.

The above examples illustrate use of head gestures for control commands. One or more embodiments may use other body parts in addition to or instead of the user's head for control command gestures. For example, the system may include sensors that measure the pose, orientation, or motion of any body part of the user, and may use these body part poses to define control command gestures. FIG. 22 illustrates an embodiment with sensors on both the head and the wrist of user 101. As described previously, user 101 may for example wear a virtual reality headset 120 with sensors 121 and a pose analyzer 122. In this example the user 101 also wears a device 2201 on the wrist, which also has a sensor or sensors 121*a* and a pose analyzer 122*a*. The device 2201 may be for example, without limitation, a smart watch or a fitness band. Embodiments may use sensors that measure motion or pose of any part of the user's body. In the embodiment of FIG. 22, both the headset 120 and the wrist device 2201 communicate wirelessly with mobile device 1601. This device may therefore coordinate gestures from both the head and the wrist. This configuration is illustrative; one or more embodiments may use any combination of processors, devices, computers, mobile devices, or microprocessors to receive and process pose data from any body part or body parts of a user. Pose data from any body part or combination of body parts may be used for any purpose, including for example, without limitation, modification of control state, changes to virtual cameras for rendering 2D projections of a 3D environment, or modification of 2D projections with overlays or other graphics or text.

In one or more embodiments, sensors on a virtual reality headset may be used to determine the user's orientation or position in a virtual world, and sensors on a different body part, such as the wrist, may be used for control command gestures. This configuration is illustrated in FIG. 23. User 101 wears virtual reality headset 120 and wrist device (such as a smart watch for example) 2201. Initially the user's head has pose 2301, and the user views display image 1522. The user rotates his head downward with motion 2302. In this illustrative embodiment head motions are associated with changes in viewpoint within the virtual world; the system rotates the virtual camera 2304 used to render the scene, and generates new display image 1522*a* in response to the user's head motion. To control the virtual reality system, the user uses wrist gestures measured by the wrist device 2201. For example, with the initial wrist orientation 2311, the user views display image 1522. When the user rotates the wrist downward with gesture 2312, the system interprets this motion of the wrist as a control command, and updates control state 2314. In this example, this gesture is associated with switching to a different virtual world. Thus the display image changes to 1523 as a result of the wrist gesture 2312.

While the invention herein disclosed has been described by means of specific embodiments and applications thereof, numerous modifications and variations could be made thereto by those skilled in the art without departing from the scope of the invention set forth in the claims.

What is claimed is:

1. A virtual reality system with control command gestures, comprising:
  at least one display viewable by a user;
  at least one sensor that generates sensor data that measures one or more aspects of a pose of one or more body parts of said user;
  a pose analyzer coupled to said at least one sensor, that calculates pose data of said pose of one or more body parts of said user, based on said sensor data generated by said at least one sensor;
  a control state comprising a command mode flag that is either true or false;
  an enter command mode command that sets said command mode flag to true when executed, wherein said enter command mode command is associated with an enter command mode gesture of one or more of said one or more body parts of said user;
  an exit command mode command that sets said command mode flag to false when executed, wherein said exit command mode command is associated with an exit command mode gesture of one or more of said one or more body parts of said user;
  one or more control commands, each configured to modify said control state when executed, each associated with one or more gestures of one or more of said one or more body parts of said user;
  a gesture recognizer coupled to said pose analyzer and to said control state, wherein said gesture recognizer
    receives said pose data from said pose analyzer;
    when said command mode flag is true,
      determines whether said user has performed a gesture associated with a control command; and,
      executes said control command to modify said control state when said user has performed said gesture associated with said control command; and,
    when said command mode flag is false,
      disables execution of any control command of said one or more control commands;
  a 3D model of a scene; and,
  a scene renderer coupled to said at least one display, said pose analyzer, said control state, and said 3D model, wherein said scene renderer
    optionally modifies or selects said 3D model of a scene based on said control state;
    receives said pose data from said pose analyzer;
    calculates one or more rendering virtual camera poses, based on said pose data and on said control state;
    calculates one or more 2D projections of said 3D model, based on said one or more rendering virtual camera poses and on said control state; and,
    transmits said one or more 2D projections to said at least one display.

2. The system of claim 1 wherein
  said gesture recognizer comprises
    a gesture motion pattern for each of said one or more gestures; and,
    a pose data time series comprising samples of said pose data received at a sequence of times from said pose analyzer; and,
  said determines whether said user has performed a gesture associated with a control command comprises compare said pose data time series to the gesture motion pattern for each of said one or more gestures.

3. The system of claim 1 wherein
said one or more body parts of said user comprise a head of said user; and,
said one or more gestures comprise gesture motions of said head of said user.

4. The system of claim 3 wherein said gesture motions of said head of said user comprise one or more of
a turn of said head right at an angular velocity exceeding a right turn threshold;
a turn of said head left at an angular velocity exceeding a left turn threshold;
a nod of said head upward at an angular velocity exceeding an upward nod threshold;
a nod of said head downward at an angular velocity exceeding a downward nod threshold;
a turn of said head to the left followed by a turn of said head to the right, wherein a time interval between a start of said turn of said head to the left and a finish of said turn of said head to the right is less than a left-right threshold;
a turn of said head to the right followed by a turn of said head to the left wherein a time interval between a start of said turn of said head to the right and a finish of said turn of said head to the left is less than a right-left threshold;
a nod of said head upward followed by a nod of said head downward wherein a time interval between a start of said nod of said head upward and a finish of said nod of said head downward is less than an up-down threshold; and,
a nod of said head downward followed by a nod of said head upward wherein a time interval between a start of said nod of said head downward and a finish of said nod of said head upward is less than a down-up threshold.

5. The system of claim 1 wherein said one or more control commands comprise one or more of
a command to switch said 3D model of a scene from a first 3D model of a first scene to a second 3D model of a second scene;
a command to pause time modifications of said 3D model;
a command to start said time modifications of said 3D model;
a command to rewind said time modifications of said 3D model;
a command to fast-forward said time modifications of said 3D model;
a command to modify a playback rate of said time modifications of said 3D model; and,
a command to modify a location of said user relative to said 3D model.

6. The system of claim 1 wherein
said control state comprises
a user input in progress flag that is either true or false; and,
a user selection value;
said one or more control commands comprise
a start user input command that sets said user input in progress flag to true;
one or more modify user selection commands that change said user selection value when said user input in progress flag is true; and
a complete user input command that sets said user input in progress flag to false; and, said scene renderer
overlays a user input control onto one or more of said one or more 2D projections while said user input in progress flag is true;
modifies an appearance of said user input control based on said user selection value.

7. The system of claim 6 wherein
said one or more body parts of said user comprise a head of said user;
said one or more gestures comprise gesture motions of said head of said user; and,
said scene renderer freezes said one or more rendering virtual camera poses while said user input in progress flag is true.

8. The system of claim 7 wherein
said complete user input command is associated with a gesture motion of said head of said user comprising said head remaining substantially still for a period of time exceeding a complete input time threshold value.

9. The system of claim 1 wherein said one or more body parts of said user comprise
a head of said user; and
a second body part of said user that differs from said head of said user.

10. The system of claim 9 wherein one or more of said one or more control commands are associated with one or more gestures of said second body part of said user.

11. The system of claim 9 wherein
said scene renderer calculates said one or more rendering virtual camera poses, based on said pose of said head of said user; and,
said one or more control commands are each associated with one or more gestures of said second body part of said user.

12. The system of claim 9 wherein
said second body part of said user is a wrist of said user; and,
said at least one sensor comprises one or more wrist sensors that measure one or more aspects of a pose of said wrist of said user.

13. The system of claim 12 wherein said one or more wrist sensors comprise one or more of
a watch; and
a fitness band.

14. The system of claim 1, further comprising:
an image warper coupled to said at least one display, said scene renderer, and said pose analyzer, wherein said image warper
receives said one or more rendering virtual camera poses from said scene renderer;
receives said pose data from said pose analyzer;
calculates a change in pose between said one or more virtual camera poses and said pose data;
generates a rerendering approximation of said one or more 2D projections of said 3D model on said at least one display based on said change in pose; and,
modifies one or more pixels of said at least one display based on said rerendering approximation.

15. The system of claim 14, wherein said rerendering approximation comprises calculating a pixel translation vector; and,
translating one or more pixels of said one or more 2D projections by said pixel translation vector.

16. The system of 15, wherein said calculating said pixel translation vector comprises
approximating said change in pose as a rotation around a unit vector $\hat{\omega}$ comprising $\hat{\omega}_y$ and $\hat{\omega}_w$ by an angle $\Delta\theta$;

calculating a spatial translation vector $(\hat{\omega}_y\Delta\theta, -\hat{\omega}_x\Delta\theta)$;
calculating a scaling factor to convert spatial distances to pixels based on pixel dimensions and fields of view of said one or more 2D projections; and,
calculating said pixel translation vector by scaling said spatial translation vector by said scaling factor.

* * * * *